(12) United States Patent
Qi et al.

(10) Patent No.: US 12,293,333 B2
(45) Date of Patent: May 6, 2025

(54) INFORMATION EXCHANGE METHOD AND APPARATUS FOR DOCUMENT PROCESSING, ELECTRONIC DEVICE, AND STORAGE MEDIUM

(71) Applicant: Beijing Zitiao Network Technology Co., Ltd., Beijing (CN)

(72) Inventors: Zikai Qi, Beijing (CN); Yifan Ding, Beijing (CN); Kuo Pei, Beijing (CN); Yangyang Xiang, Beijing (CN); Jieke Lin, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/666,626

(22) Filed: May 16, 2024

(65) Prior Publication Data

US 2024/0303604 A1    Sep. 12, 2024

Related U.S. Application Data

(63) Continuation of application No. PCT/CN2022/131710, filed on Nov. 14, 2022.

(30) Foreign Application Priority Data

Nov. 17, 2021    (CN) .......................... 202111364880.7

(51) Int. Cl.
*G06Q 10/101* (2023.01)
*G06F 3/0482* (2013.01)
(Continued)

(52) U.S. Cl.
CPC ......... *G06Q 10/101* (2013.01); *G06F 3/0482* (2013.01); *G06F 21/629* (2013.01);
(Continued)

(58) Field of Classification Search
CPC .... G06F 3/0482; G06F 21/629; G06F 40/194; G06F 40/166; G06F 40/197; G06Q 10/101

See application file for complete search history.

(56) References Cited

U.S. PATENT DOCUMENTS 8,938,669 B1    1/2015 Cohen
9,424,347 B2 *  8/2016 Burman .................. G06F 16/38
(Continued)

FOREIGN PATENT DOCUMENTS

CN    108924038 A    11/2018
CN    109150990 A    1/2019
(Continued)

OTHER PUBLICATIONS

China Patent Application No. 202111364880.7; First Office Action; dated May 23, 2022; 17 pages.
(Continued)

*Primary Examiner* — Tadesse Hailu
(74) *Attorney, Agent, or Firm* — BakerHostetler

(57) ABSTRACT

The present disclosure relates to an information interaction method and apparatus for document processing, and an electronic device and a storage medium. A control method provided in the embodiments of the present disclosure includes: displaying a document processing interface, wherein the document processing interface is used for displaying a processed document and a processing mark thereof; and in response to a first operation event for a group creation identifier associated with the document processing interface, creating a communication group on the basis of at least one of a person associated with the processed document, the processed document or the processing mark.

20 Claims, 9 Drawing Sheets

(51) Int. Cl.
  *G06F 21/62* (2013.01)
  *G06F 40/166* (2020.01)
  *G06F 40/194* (2020.01)
  *G06F 40/197* (2020.01)
(52) U.S. Cl.
  CPC .......... *G06F 40/166* (2020.01); *G06F 40/194* (2020.01); *G06F 40/197* (2020.01)

(56) References Cited

U.S. PATENT DOCUMENTS

| | | | |
|---|---|---|---|
| 10,042,832 B1* | 8/2018 | Vagell | G06F 40/103 |
| 11,520,974 B2* | 12/2022 | Sun | G06F 3/0488 |
| 11,652,930 B2* | 5/2023 | Hammond | H04N 1/00145 |
| | | | 358/1.15 |
| 12,159,103 B1* | 12/2024 | Khoo | G06F 40/106 |
| 2004/0143603 A1* | 7/2004 | Kaufmann | G09B 5/08 |
| 2004/0143630 A1* | 7/2004 | Kaufmann | G09B 7/02 |
| | | | 709/224 |
| 2004/0153504 A1* | 8/2004 | Hutchinson | G06Q 10/10 |
| | | | 709/204 |
| 2005/0102628 A1* | 5/2005 | Salesin | G06T 1/20 |
| | | | 715/764 |
| 2007/0055926 A1* | 3/2007 | Christiansen | G06Q 10/10 |
| | | | 715/244 |
| 2007/0074127 A1* | 3/2007 | Acker | G06F 16/00 |
| | | | 715/764 |
| 2008/0177782 A1* | 7/2008 | Poston | G06F 40/197 |
| | | | 707/999.102 |
| 2009/0157811 A1* | 6/2009 | Bailor | G06F 40/166 |
| | | | 709/204 |
| 2011/0296507 A1* | 12/2011 | Khosrowshahi | G06F 40/134 |
| | | | 715/810 |
| 2012/0185759 A1* | 7/2012 | Balinsky | G06F 21/6227 |
| | | | 715/209 |
| 2013/0007578 A1* | 1/2013 | Shreck | G06F 40/197 |
| | | | 715/205 |
| 2014/0032616 A1* | 1/2014 | Nack | G06F 9/451 |
| | | | 715/230 |
| 2014/0081995 A1 | 3/2014 | Martin et al. | |
| 2014/0101526 A1* | 4/2014 | Marsh | G06F 40/197 |
| | | | 715/229 |
| 2014/0245015 A1* | 8/2014 | Velamoor | H04L 63/108 |
| | | | 713/171 |
| 2014/0250360 A1* | 9/2014 | Jiang | G06F 40/197 |
| | | | 715/229 |
| 2014/0337279 A1 | 11/2014 | Mo et al. | |
| 2014/0351693 A1* | 11/2014 | Glassop | G06Q 10/10 |
| | | | 715/235 |
| 2015/0113390 A1* | 4/2015 | Vagell | G06F 40/106 |
| | | | 715/255 |
| 2016/0196247 A1 | 7/2016 | Lee et al. | |
| 2017/0168692 A1 | 6/2017 | Chandra et al. | |
| 2017/0220546 A1* | 8/2017 | Codrington | G06F 16/2282 |
| 2018/0018468 A1* | 1/2018 | Williams | G06F 21/64 |
| 2018/0121394 A1 | 5/2018 | Denoue et al. | |
| 2018/0181552 A1* | 6/2018 | Konnola | G06F 16/93 |
| 2018/0219923 A1* | 8/2018 | Berger | G06Q 10/101 |
| 2020/0272788 A1* | 8/2020 | Sanderson | G06V 30/416 |
| 2020/0293712 A1* | 9/2020 | Potts | G06F 3/04842 |
| 2021/0004434 A1* | 1/2021 | Bindal | H04L 65/75 |
| 2021/0133681 A1 | 5/2021 | Dhaliwal et al. | |
| 2021/0248556 A1* | 8/2021 | Venkatraman | G06Q 10/103 |
| 2022/0222461 A1* | 7/2022 | Mann | H04L 63/105 |
| 2022/0400141 A1* | 12/2022 | Curry | G06F 16/176 |
| 2023/0055241 A1* | 2/2023 | Zionpour | G06F 16/958 |
| 2023/0162153 A1* | 5/2023 | Khokhar | G06F 16/2379 |
| | | | 705/38 |
| 2024/0127617 A1* | 4/2024 | Amamou | G06V 30/19133 |

FOREIGN PATENT DOCUMENTS

| | | |
|---|---|---|
| CN | 109510754 A | 3/2019 |
| CN | 109976617 A | 7/2019 |
| CN | 111277487 A | 6/2020 |
| CN | 111783405 A | 10/2020 |
| CN | 112035861 A | 12/2020 |
| CN | 112163406 A | 1/2021 |
| CN | 112241865 A | 1/2021 |
| CN | 112286890 A | 1/2021 |
| CN | 112307397 A | 2/2021 |
| CN | 113157168 A | 7/2021 |
| CN | 113254815 A | 8/2021 |
| CN | 114047854 A | 2/2022 |
| CN | 114047854 B | 9/2023 |
| JP | 2014514664 A | 6/2014 |
| JP | 2019021314 A | 2/2019 |
| JP | 2019128689 A | 8/2019 |
| JP | 2023522672 A | 5/2023 |
| WO | WO 2021/218795 A1 | 11/2021 |

OTHER PUBLICATIONS

China Patent Application No. 202111364880.7; Second Office Action; dated Aug. 29, 2022; 15 pages.
International Patent Application No. PCT/CN2022/131710; Int'l Written Opinion and Search Report; dated Jan. 20, 2023; 7 pages.
China Patent Application No. 202111364880.7; Notification to Grant; Aug. 24, 2023; 7 pages.
Communication pursuant to Rules 70(2) and 70a(2) EPC for European Application No. 22894742.0, mailed Feb. 4, 2025, 01 Page.
Extended European Search Report for European Application No. 22894742.0, mailed Jan. 17, 2025, 8 Pages.
Notice of Reasons for Refusal for Japanese Patent Application No. 2024-529567 dated Dec. 10, 2024, 11 pages.

* cited by examiner

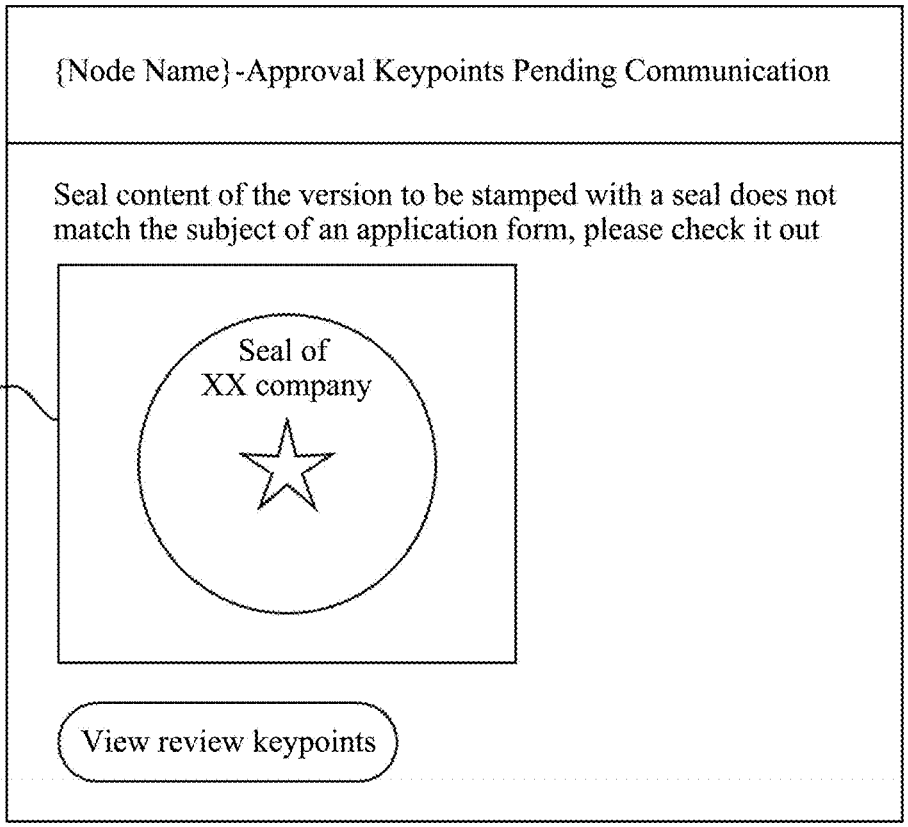

Display a document processing interface, the document processing interface being used to display a processed document and a processing mark thereof — S220

In response to an operation event for a preset identifier associated with the document processing interface, generate processing chat information based on at least one of the processing mark or processing process node information of the processed document, the processing chat information being used to be shared in a chat interface — S240

FIG. 9

INFORMATION EXCHANGE METHOD AND APPARATUS FOR DOCUMENT PROCESSING, ELECTRONIC DEVICE, AND STORAGE MEDIUM

CROSS-REFERENCE TO RELATED APPLICATIONS

This application is a continuation of International Application No. PCT/CN2022/131710 filed on Nov. 14, 2022, which claims the priority to and benefits of Chinese Patent Application No. 202111364880.7, filed on Nov. 17, 2021. All the aforementioned patent applications are hereby incorporated by reference in their entireties.

TECHNICAL FIELD

The present disclosure relates to the field of computer technologies, and in particular, to an information exchange method and apparatus for document processing, an electronic device, and a storage medium.

BACKGROUND ART

When drafting, revising, and reviewing a business document, a team needs to carry out communication and discussion on revisions made to the business document. However, the team lacks an efficient mode or means of communication for revision and finalization of the business document, resulting in a low processing efficiency of the business document.

SUMMARY OF THE INVENTION

This section Summary of the Invention is provided to give a brief overview of concepts, which will be described in detail later in the section Detailed Description of Embodiments. This section Summary of the Invention is neither intended to identify key or necessary features of the claimed technical solutions, nor is it intended to be used to limit the scope of the claimed technical solutions.

In a first aspect, according to one or more embodiments of the present disclosure, there is provided an information exchange method for document processing, the method including: displaying a document processing interface, the document processing interface being used to display a processed document and a processing mark thereof; and in response to a first operation event for a group creation identifier associated with the document processing interface, creating a communication group based on at least one of a person associated with the processed document, the processed document, or the processing mark.

In a second aspect, according to one or more embodiments of the present disclosure, there is provided an information exchange method for document processing, the method including: displaying a document processing interface, the document processing interface being used to display a processed document and a processing mark thereof; and in response to an operation event for a preset identifier associated with the document processing interface, generating processing chat information based on at least one of the processing mark or processing process node information of the processed document, the processing chat information being used to be shared in a chat interface.

In a third aspect, according to one or more embodiments of the present disclosure, there is provided an information exchange method for document processing, the method including: displaying a document processing interface, the document processing interface being used to display a processed document and a processing mark thereof; in response to an operation event for a preset identifier associated with the document processing interface, generating processing chat information based on at least one of the processed document, the processing mark, or processing process node information of the processed document, the processing chat information being used to be shared in a chat interface; displaying a sharing interface, the sharing interface including a list of candidate sharers, and the list of candidate sharers displaying at least one person associated with the processed document; determining a sharer in response to an operation event for the sharing interface; and sending the processing chat information to the sharer.

In a fourth aspect, according to one or more embodiments of the present disclosure, there is provided an information exchange apparatus for document processing, the apparatus including: a processing interface display unit configured to display a document processing interface, the document processing interface being used to display a processed document and a processing mark thereof; and
a communication group creation unit configured to, in response to a first operation event for a group creation identifier associated with the document processing interface, create a communication group based on at least one of a person associated with the processed document, the processed document, or the processing mark.

In a fifth aspect, according to one or more embodiments of the present disclosure, there is provided an information exchange apparatus for document processing, the apparatus including:
a processing interface display unit configured to display a document processing interface, the document processing interface being used to display a processed document and a processing mark thereof; and
a first chat information generation unit configured to, in response to an operation event for a preset identifier associated with the document processing interface, generate processing chat information based on at least one of the processing mark or processing process node information of the processed document, the processing chat information being used to be shared in a chat interface.

In a sixth aspect, according to one or more embodiments of the present disclosure, there is provided an information exchange apparatus for document processing, the apparatus including: a processing interface display unit configured to display a document processing interface, the document processing interface being used to display a processed document and a processing mark thereof;
a second chat information generation unit configured to, in response to an operation event for a preset identifier associated with the document processing interface, generate processing chat information based on at least one of the processed document, the processing mark, or processing process node information of the processed document, the processing chat information being used to be shared in a chat interface;
a sharing interface display unit configured to display a sharing interface, the sharing interface including a list of candidate sharers, and the list of candidate sharers displaying at least one person associated with the processed document;

a sharer determination unit configured to determine a sharer in response to an operation event for the sharing interface; and a chat information sending unit configured to send the processing chat information to the sharer.

In a seventh aspect, according to one or more embodiments of the present disclosure, there is provided an electronic device, the electronic device including: at least one memory and at least one processor, where the memory is configured to store program code, and the processor is configured to call the program code stored in the memory to cause the electronic device to perform the information exchange method for document processing according to one or more embodiments of the present disclosure.

In an eighth aspect, according to one or more embodiments of the present disclosure, there is provided a non-transitory computer storage medium, the non-transitory computer storage medium storing program code that, when executed by a computer device, causes the computer device to perform the information exchange method for document processing according to one or more embodiments of the present disclosure.

According to one or more embodiments of the present disclosure, in response to receiving a document upload operation in a processing interface for a first document, a second document uploaded by a user is obtained as a document associated with the first document, and at least one person associated with the first document is caused to be associated with the second document, to enable the second document to be reviewed by the at least one associated person, such that the first document and the document associated therewith can be jointly handled by the person associated with the first document.

According to one or more embodiments of the present disclosure, the processing chat information is generated based on at least one of the processing mark or the processing process node information of the processed document, to facilitate the forwarding of the processing chat information to other users or groups by a user, such that this document processing manner is more fit for a chat communication form, thereby improving the communication and processing efficiency of the user for document processing.

According to one or more embodiments of the present disclosure, the processing chat information is generated based on at least one of the processed document, the processing mark, or the processing process node information of the processed document, and the person associated with the processed document is displayed via the sharing interface, to facilitate the sharing of the processing chat information with the person associated with the processed document by the user, such that this document processing manner is more fit for a chat communication form, thereby improving the communication and processing efficiency of the user for document processing.

BRIEF DESCRIPTION OF DRAWINGS

The foregoing and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

FIG. 8 is a schematic diagram of an interface for second processing chat information according to another embodiment of the present disclosure;

FIG. 9 is a flowchart of an information exchange method for document processing according to another embodiment of the present disclosure;

DETAILED DESCRIPTION OF THE INVENTION

Figure 1:
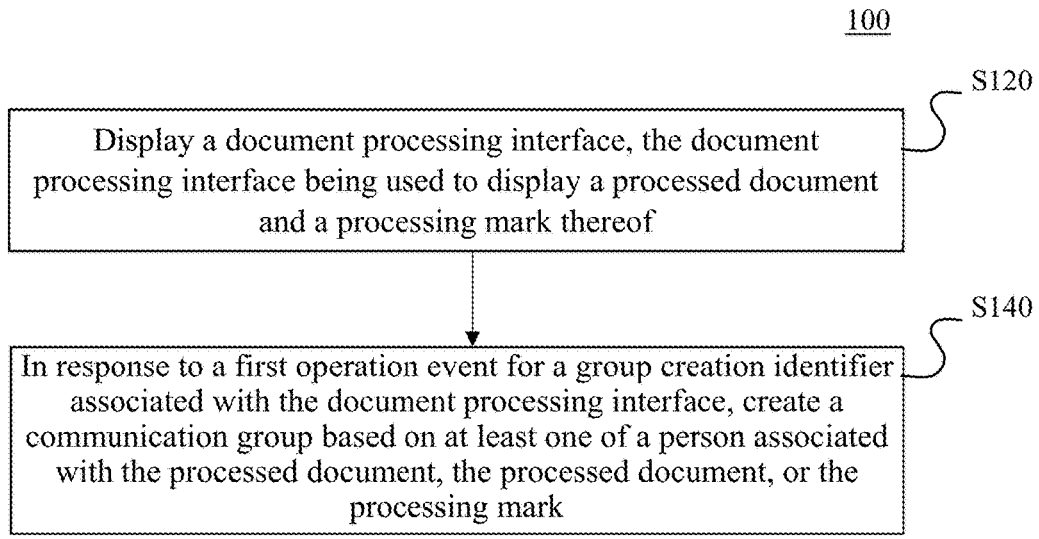
FIG. 1 is a flowchart of an information exchange method for document processing according to an embodiment of the present disclosure.

Embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the steps described in the implementations of the present disclosure may be performed in different orders, and/or performed in parallel. Furthermore, additional steps may be included and/or the execution of the illustrated steps may be omitted in the implementations. The scope of the present disclosure is not limited in this respect.

The term "include/comprise" used herein and the variations thereof are an open-ended inclusion, namely "include/comprise but not limited to". The term "based on" is "at least partially based on". The term "an embodiment" means "at least one embodiment". The term "another embodiment" means "at least one another embodiment". The term "some embodiments" means "at least some embodiments". The term "in response to" and related terms mean that one signal or event is affected by another signal or event to a certain extent, but not necessarily completely or directly. If an event x occurs "in response to" an event y, x may respond to y directly or indirectly. For example, the occurrence of y may eventually lead to the occurrence of x, but there may be other intermediate events and/or conditions. In other cases, y may not necessarily lead to the occurrence of x, and x may occur even if y has not yet occurred. In addition, the term "in response to" may also be "at least partially in response to".

The term "determine" broadly encompasses a variety of actions, which may include obtaining, calculating, computing, processing, deducing, researching, searching (e.g., searching in a table, database, or other data structures), probing, and the like, and may further include receiving (e.g., receiving information), accessing (e.g., accessing data in a memory), and the like, as well as parsing, selecting, choosing, building, and the like. Related definitions of other terms will be given in the description below. Related definitions of other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

For the purposes of the present disclosure, the phrase "A and/or B" refers to (A), (B), or (A and B).

The names of messages or information exchanged between a plurality of apparatuses in the implementations of the present disclosure are used for illustrative purposes only, and are not used to limit the scope of these messages or information.

Referring to FIG. 1, FIG. 1 is a flowchart of an information exchange method 100 for document processing according to an embodiment of the present disclosure. The method 100 includes the following steps.

Step S120: Display a document processing interface, the document processing interface being used to display a processed document and a processing mark thereof.

In some embodiments, the processing mark includes a revision mark or revision trace, such as an addition, an insertion and a deletion, made to document content, and a note, a comment, etc. made to the document content. The processing mark may be displayed in the document content and/or in an associated area of the document.

In some embodiments, the processing mark may also show context information of the revision mark, the revision trace, or the comment, and type information of the processing mark, to facilitate quick understanding of the meaning of the processing mark by a user.

In some embodiments, the document processing interface may be used to display a difference between two processed documents, and one or more processing marks are generated based on the difference.

Step S140: In response to a first operation event for a group creation identifier associated with the document processing interface, create a communication group based on at least one of a person associated with the processed document, the processed document, or the processing mark.

For example, the first operation event for the group creation identifier includes, but is not limited to, a touch operation event, a click operation event, a gesture operation event, and a voice operation event for the group creation identifier.

It needs to be noted that the group creation identifier may be located in the document processing interface, or may be set in a multi-level interface that is accessed or opened via the document processing interface, which is not limited here in the present disclosure.

In the information exchange method for document processing according to one ore more embodiments of the present disclosure, the document processing interface is displayed, and the communication group is created based on at least one of the person associated with the processed document, the processed document, or the processing mark, in response to the first operation event for the group creation identifier associated with the document processing interface, such that the efficiency of creating the communication group associated with the processed document can be increased, thereby facilitating targeted communication on the processed document via the created associated communication group.

In some embodiments, step S140 includes the following steps.

Step A1: Display a group creation interface in response to the first operation event for the group creation identifier associated with the document processing interface, the group creation interface including a list of group candidate members, and the list of group candidate members displaying at least one associated person;

Step A2: Determine a group candidate member in response to a second operation event for the group creation interface.

In some embodiments, the second operation event may include a selection or deletion operation event of a user on a member displayed in the list of group candidate members. Alternatively, the second operation event includes an operation event of a user for adding a user other than members in the list of group candidate members via a functional control provided in the group creation interface.

For example, the user may select one or more members from the list of group candidate members as the group candidate member, and may also delete one or more members from the list of group candidate members and then take the remaining members as the group candidate member. The user may also add a user other than the members in the list of group candidate members via the functional control provided in the group creation interface, and then take the added user as the group candidate member.

Step A3: Create the communication group based on the group candidate member determined by a user.

In this embodiment, the person associated with the processed document is displayed in the list of group candidate members, to facilitate the creation of the communication group by the user based on the person associated with the processed document, such that the person associated with the processed document can make targeted communication on processing of the processed document via the created communication group.

In some embodiments, the associated person is preferentially displayed in the list of group candidate members. For example, the person associated with the processed document is ranked higher than other persons or is highlighted in the list of group candidate members. As such, the selection of the associated person from the list of group candidate members by the user is facilitated.

In some embodiments, the communication group may also be created directly based on the person associated with the processed document, for example, by triggering an identifier of quick group creation to create the communication group by selecting a person that is associated with the processed document and satisfies a preset condition as a group member by default, without the need to select candidates individually, thus further improving the efficiency of creating the communication group associated with the processed document. For example, the associated person who satisfies the preset condition may be a person who has a preset association relationship with the processed document, such as a reviewer associated with the document.

In some embodiments, the associated person includes at least one of the following persons: an executor of a process node of a processing process of the processed document, a person associated with document content of the processed document, or a person who has a preset reporting relationship with the executor of the process node or with the person associated with the document content.

In some embodiments, the executor of the process node includes at least one of the following: an initiator of the processing process of the processed document, or a handler who has already handled, currently handles, or is to handle the processed document; and the person associated with the document content of the processed document includes at least one of the following: an owner, a drafter, or a reviser of the processed document.

The document processing in the present disclosure is illustrated below using a contract review scenario as an example. The document processing interface may be a contract review interface, which may show content of a contract under review and a review mark thereof. The document processing process may be a contract review process. Process nodes of the contract review process may include an initiation node, one or more levels of review nodes, a stamping node, and an archiving node. Correspondingly, executors of the process nodes may be an initiator of the contract review, first-level, second-level, and third-level reviewers, etc. responsible for review of the contract, a person who stamps the contract with a seal, and a contract archivist. A person who has a preset reporting relationship with the executors of the process nodes or with the person associated with the document content may be the head of a department where the contract reviewer is working or other leaders. A person associated with the contract content may be an applicant, a drafter, or a reviser of the contract.

Further, the reviewer is illustrated using a three-level review node as an example. If a current review node is a second-level node, that is, the contract is being reviewed by the second-level reviewer, the first-level reviewer may be a reviewer who has already reviewed the contract, the second-level reviewer is a reviewer who currently reviews the contract, and the third-level reviewer is a reviewer who is to review the contract.

In some embodiments, executors of process nodes are sorted in the list of candidate members according to an order of the process nodes. For example, the executors of the process nodes may be sequentially sorted according to the order of the initiator of the document processing process, first-level, second-level, and third-level handlers, etc. responsible for processing of the processed document, a person who stamps the document with a seal, and a document archivist.

In some embodiments, the list of group candidate members preferentially displays a handler who currently handles or is to handle the processed document. For example, the handler who currently handles or is to handle the processed document is ranked higher than other persons or is highlighted in the list of group candidate members. As such, by preferentially displaying the handler who currently handles or is to handle the processed document in the list of group candidate members, a quick selection of a person in strong association with the processing mark to be discussed as a group member can be facilitated.

In some embodiments, the group creation interface includes a search interface. Step S140 includes the following step.

Step B1: Determine the group candidate member from a preset set of users based on user information entered by the user in the search interface.

In some embodiments, users in the preset set of users correspond to a same community, e.g., a same enterprise, school, institution, organization, etc. For example, user accounts that each have a preset field may be used as the preset set of users.

In some embodiments, the group creation interface includes an information edit interface. The method 100 further includes the following steps.

Step S131: Obtain information entered by the user in the information edit interface.

Step S132: Send the entered information to the communication group after the creation of the communication group.

For example, the user can enter explanatory and illustrative information in the information edit interface during the creation of the group, and the information may be sent, as a chat message, to the communication group after the communication group is created.

Figure 2:
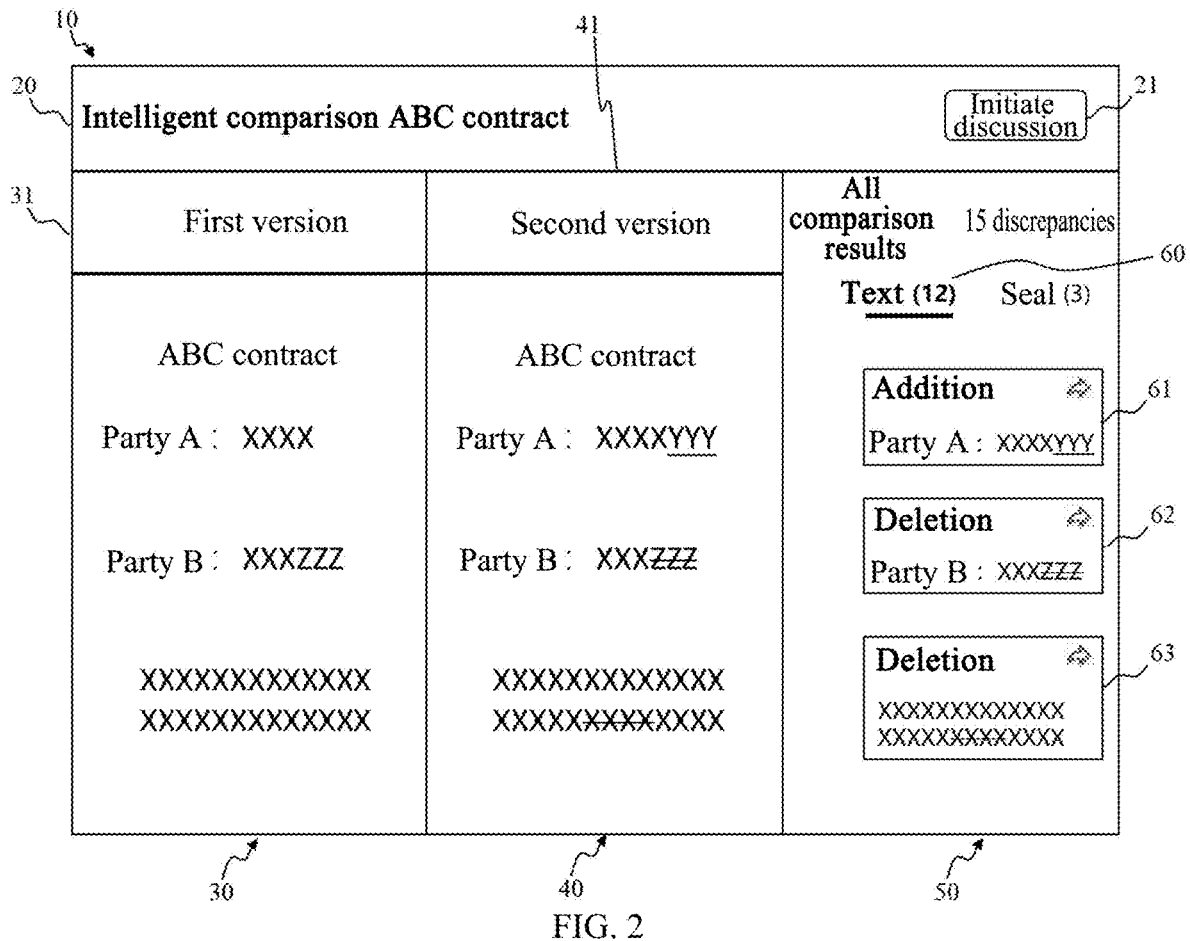
FIG. 2 is a schematic diagram of a document processing interface according to an embodiment of the present disclosure.
Figure 3:
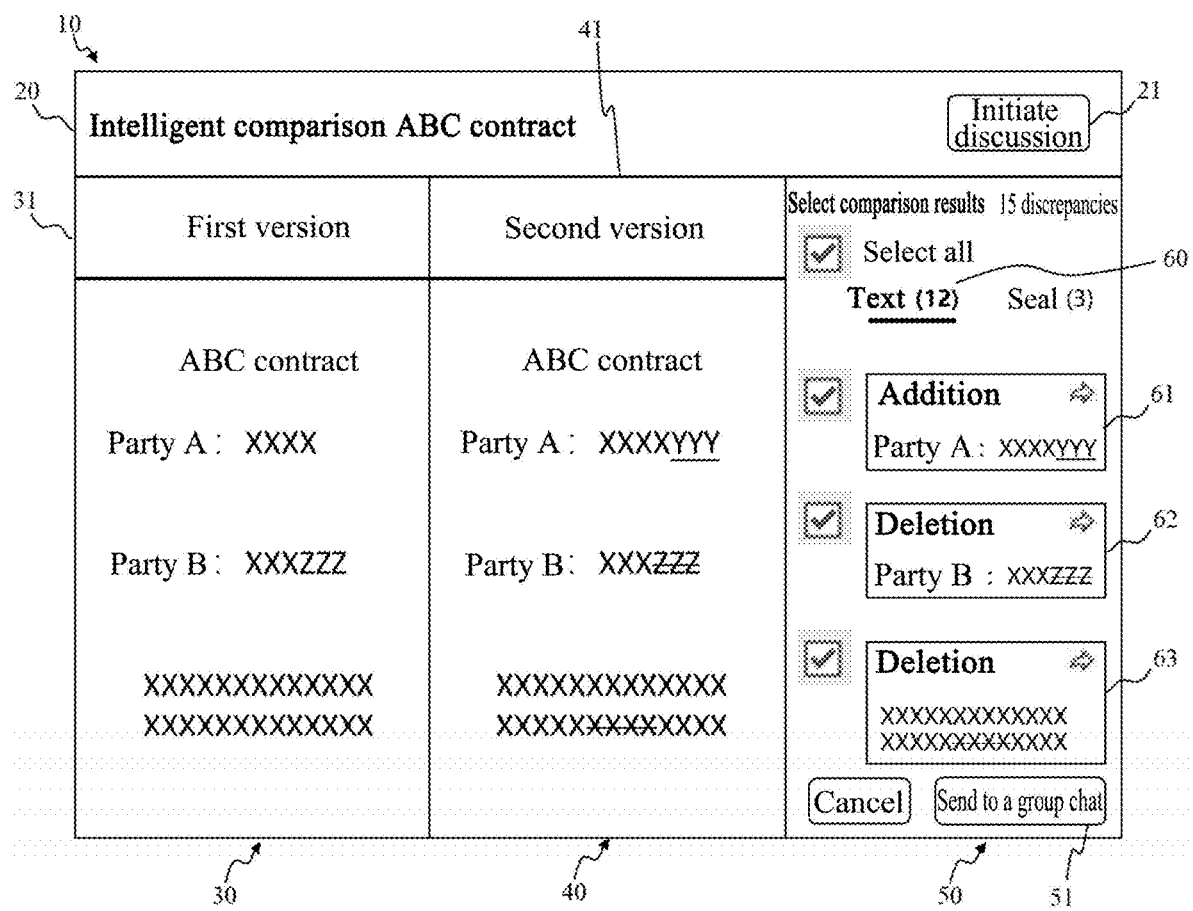
FIG. 3 is a schematic diagram of a document processing interface according to another embodiment of the present disclosure.

FIG. 2 and FIG. 3 show a document processing interface according to an embodiment of the present disclosure. The document processing interface 10 includes a title interface 20, a first area 30, a second area 40, and a third area 50.

The title interface 20 may display attribute information of the processed document, such as title information, type information, and number information of the processed document. The title interface 20 also displays a group creation identifier 21. The user can create a group by triggering the group creation identifier 21.

The first area 30 is used to display content of a first document. In some embodiments, the first area 30 has a first title area 31, which can be used to display one or more of title information, version information, and time information of the first document.

The second area 40 is used to display content of a second document. In some embodiments, the second area 40 has a second title area 41, which can be used to display one or more of title information, version information, and time information of the second document.

The third area 50 is used to display a difference between the first document and the second document. In some embodiments, the third area 50 has a first sub-interface 60 used to display a difference in document content. As shown in FIG. 2, there are currently "12" differences in document content between the first document and the second document, and the third area 50 currently displays three of the differences, namely, processing marks 61, 62, and 63. In some embodiments, the second document may be the processed document, the first document may be a comparative document for comparison with the processed document, and the third area is used to display the processing marks. The processing marks are used to identify the differences between the processed document and the comparative document, including, but not limited to, a text comparison difference, a table comparison difference, a picture comparison difference, an added page comparison difference, and a seal comparison difference.

The processing mark 61 displays type information "Addition" of the processing mark, a revision mark or revision trace "YYY", and context information "Party A: XXXX" of the revision mark or revision trace, where the underline indicates that "YYY" is a part of the second document that is added to the first document.

The processing mark 62 displays type information "Deletion" of the processing mark, a revision mark or revision trace " ", and context information "Party B: XXX" of the revision mark or revision trace, where the strikeout line through the text indicates that "ZZZ" is a part of the second document that is deleted from the first document.

In some embodiments, the third display area further has a second sub-interface, and the second sub-interface is used to display a difference between seal content associated with the document and the document content, such as a difference indicating that the seal content associated with the document does not match subject information in the document content.

Figure 4:
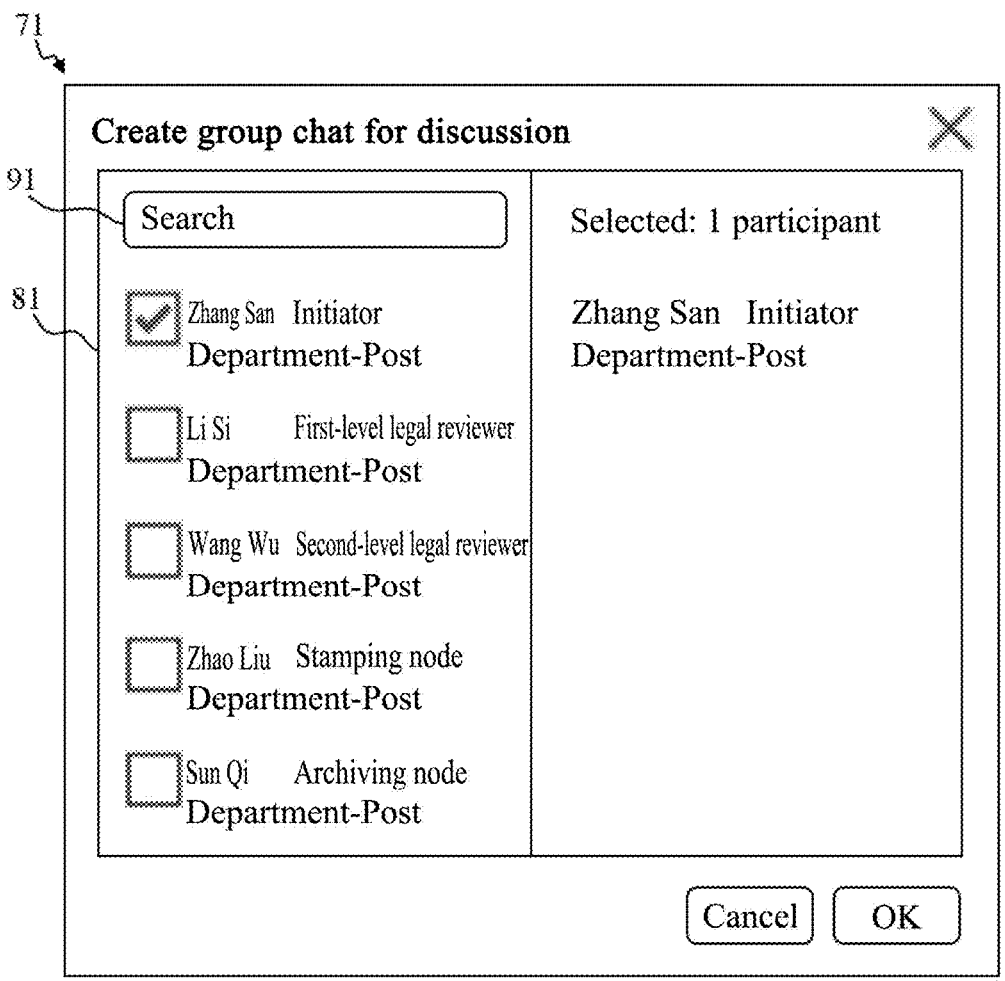
FIG. 4 is a schematic diagram of a group creation interface according to an embodiment of the present disclosure.

FIG. 4 shows a group creation interface according to an embodiment of the present disclosure. The group creation interface 71 displays a list 81 of candidate members. The list of candidate groups displays a plurality of persons associated with the processed document, and a user can check or uncheck a person displayed in the group candidate list to determine a group candidate member. The group creation interface 71 also displays a search interface 91, and the user can search for a group candidate member via the search interface 91.

As shown in FIG. 4, the list of group candidate members displays role information, department information, and post information of the associated person in the processing process of the processed document.

For example, the role information includes an initiator of the processing process of the processed document, first-level, second-level, third-level, etc. handlers responsible for processing of the processed document, a person who stamps the processed document with a seal, and an archivist of the processed document. For example, the role information shown in FIG. 4 includes "Initiator", "First-level legal reviewer", "Second-level legal reviewer", "Stamping node", "Archiving node", etc.

Figure 5:
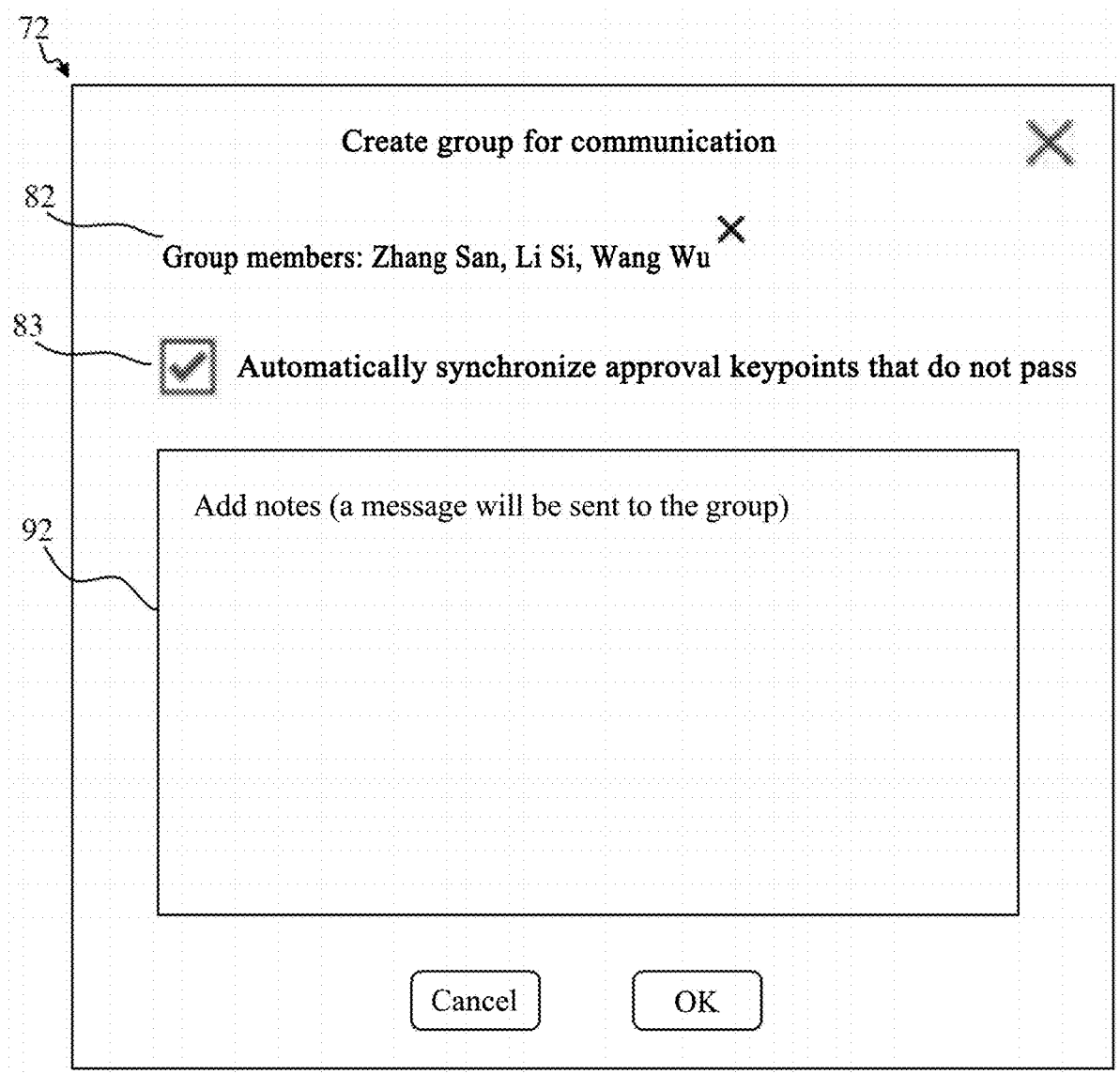
FIG. 5 is a schematic diagram of a group creation interface according to another embodiment of the present disclosure.

FIG. 5 shows a group creation interface according to an embodiment of the present disclosure. The group creation interface 72 displays a list 82 of candidate members. The list of candidate groups displays, by default, persons associated with the processed document, including "Zhang San", "Li Si", and "Wang Wu". A user can add or delete a person displayed in the list of group candidates. The group creation interface 72 also displays an information edit interface 92. The user can enter explanatory and illustrative information in the information edit interface 92, and the information may be sent, as a chat message, to a communication group after the communication group is created. In some embodiments, the list of candidate groups may be filled, by default, with approvers of a current processing node and a previous processing node thereof.

In some embodiments, step S140 includes the following step.

Step C1: Determine a name of the communication group based on at least one of the following: identifier information of the processed document, processing process information of the processed document, group number information, group creator information, group creation time information, or processing mark information. As such, by generating the group name of the communication group based on the above information, the efficiency of creating the communication group can be improved, and targeted communication on the processed document among group members via the communication group can be facilitated.

For example, the group name may be in the format of "{Project Name}-Contract Application-{Contract Name}-{Contract Number} Communication Group", such as "{XYZ Project}-Contract Application-{ABC Contract}-{123456} Communication Group".

In some embodiments, the group name may also include processing summary information generated based on the processing mark, such as "Signature subject", "Currency check", to further facilitate the targeted communication on the processed document among the group members via the communication group.

In some embodiments, the name of the communication group includes the group number information when at least one of the following conditions is met: at least one communication group is created based on a same processing process; or at least one communication group is created based on a same processing process node; or different communication groups are indistinguishable based on information, other than the group number information, in the name of the communication group. As such, by including the group number information in the name of the communication group, the problem of a failure to distinguish automatically generated group names due to the creation of the group based on the same processing process or the same process node, etc. can be avoided, thereby preventing the occurrence of ineffective communication due to confusion among the group members.

In some embodiments, the method 100 further includes the following steps.

Step S151: Generate processing chat information based on at least one of the processed document, the processing mark, or processing process node information of the processed document.

Step S152: Display the processing chat information in a chat interface corresponding to the communication group.

In this embodiment, the processing chat information is generated based on at least one of the processed document, the processing mark, or the processing process node information of the processed document, to enable the user to make communication about document processing affairs based on the processing chat information displayed in the communication group, such that this document processing manner is more fit for a communication form of the communication group, thereby improving the working efficiency of the user for performing document processing via the communication group.

In some embodiments, the method 100 further includes the following steps.

Step 161: Detect whether there is a first processing mark for the processed document.

Step 162: Display, upon detecting that there is the first processing mark, processing chat information corresponding to the first processing mark in a chat interface corresponding to the communication group.

In some embodiments, the first processing mark is used to indicate that the processed document is revised or that there is a difference between seal content associated with the document and document content.

In some embodiments, it is possible to choose whether to synchronize the processing chat information in the chat interface during group creation. For example, referring to FIG. 5, the group creation interface 72 displays a preset identifier 83. After the user checks the preset identifier 83, one or more processing marks in the document processing interface can be synchronized to the chat interface of the created communication group in the form of the processing chat information. In some embodiments, the one or more synchronized processing marks are undeleted or unapproved processing marks, such as approval keypoints that do not pass.

According to one or more embodiments of the present disclosure, when it is detected that there is the first processing mark, the processing chat information corresponding to the first processing mark may be displayed in the chat interface corresponding to the communication group, to remind the user of the processing mark of the processed document in a timely manner.

In some embodiments, step S151 includes the following steps.

Step F1: Determine a target processing mark in response to a selection operation of a user on the processing mark.

Step F2: Generate the processing chat information based on the target processing mark, the target processing mark including one or more processing marks.

For example, referring to FIG. 2 and FIG. 3, after the identifier 21 is triggered, the user may make a single, double, or full selections on the processing marks displayed in the document processing interface, and a processing mark selected by the user is determined to be the target processing mark.

Further, referring to FIG. 3, once the user has selected the processing mark, an identifier 51 may be triggered to create a new communication group. For example, after the identifier 51 is triggered, the group creation interface 71 as shown in FIG. 4 can be displayed for the user to create the new communication group. After the creation of the communication group, the processing mark selected by the user is synchronized to a chat interface of the communication group in the form of processing chat information.

A person skilled in the art may understand that the one or more processing marks displayed in the document processing interface may also be synchronized, by default and in the form of the processing chat information, to the chat interface corresponding to the communication group after the creation of the communication group, without the need for the user to make a selection for the processing mark in advance, which is not limited here in the present disclosure. For example, the processing chat information may be displayed in the chat interface corresponding to the communication group in response to the creation of the communication group, where the processing chat information is generated based on at least one of the processed document, the processing mark, or the processing process node information of the processed document.

In some other embodiments, after the identifier 51 is triggered, a list of candidate sharers can be displayed. The user can select one or more sharers from the list of candidate sharers, and the processing mark will be synchronized to the selected sharers in the form of the processing chat information. For example, the list of sharers may display one or more user names or group names.

In some embodiments, the processing chat information includes first processing chat information and/or second processing chat information.

In some embodiments, there is at least one piece of second processing chat information, and each piece of second processing chat information corresponds to one or more processing marks.

In this embodiment, each piece of second processing chat information corresponds to one or more processing marks, such that the group member can directly carry out communication on the corresponding processing marks based on the second processing chat information, thereby further providing more targeted communication.

In some embodiments, the first processing chat information includes at least one of the following content:
identifier information of the processed document, type information of the processed document, processing result summary information, current node information of the processing process of the processed document, or initiator information of the processing process of the processed document.

Figure 6:
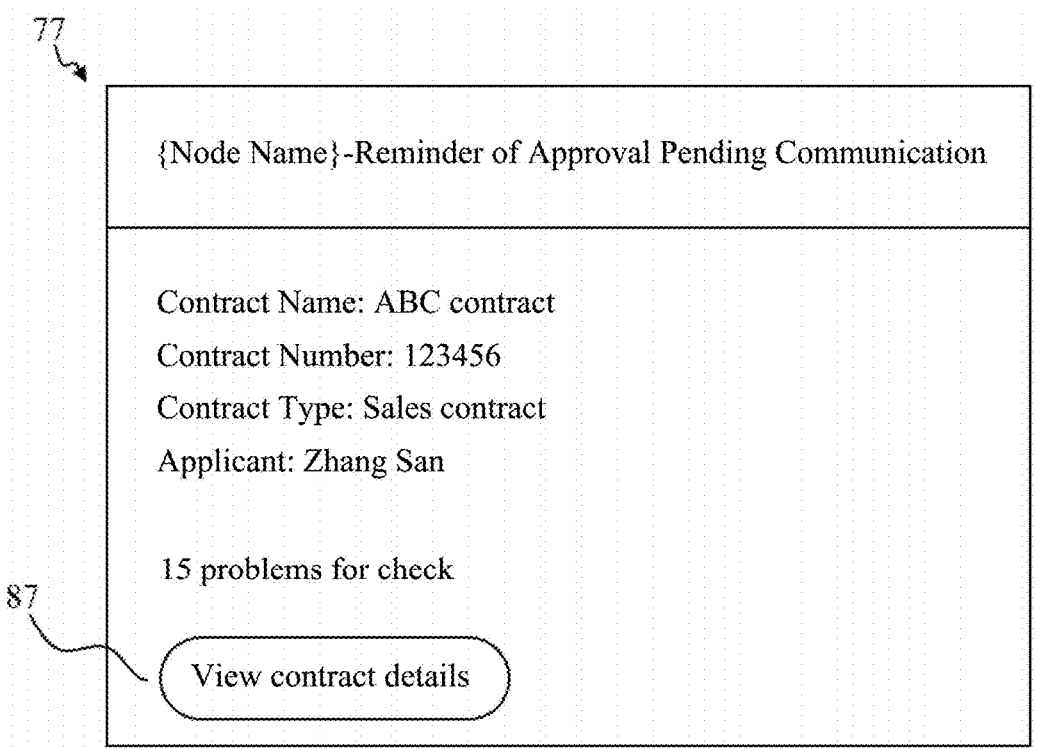
FIG. 6 is a schematic diagram of an interface for first processing chat information according to an embodiment of the present disclosure.

Referring to FIG. 6, FIG. 6 is a schematic diagram of first processing chat information according to an embodiment of the present disclosure. The first processing chat information 77 displays a chat information subject "{Node Name}-Reminder of Approval Pending Communication", name information "ABC Contract" of the processed document, number information "123456" of the processed document, type information "Sales Contract" of the processed document, applicant information "Zhang San" of the processed document, and "processing result summary information" generated based on processing marks.

According to one or more embodiments of the present disclosure, the first processing chat information is displayed in the chat interface of the communication group, such that the group member can quickly learn information about and the overall processing of the processed document.

In some embodiments, the second processing chat information includes at least one of the following content:
content of the processing mark, a processed object corresponding to the processing mark, context information of the processed object, type information of the processing mark, or current processing node information of the processing process of the processed document.

In some embodiments, the content of the processing mark, the processed object corresponding to the processing mark, and the context information of the processed object are displayed as a picture in the second processing chat information.

For example, in response to a request for sending the processing mark to a chat, a picture may be generated based on the processing mark (e.g., the picture may be generated in a snapshot manner, or based on selected content, etc.), and then displayed in the second processing chat information.

Figure 7:
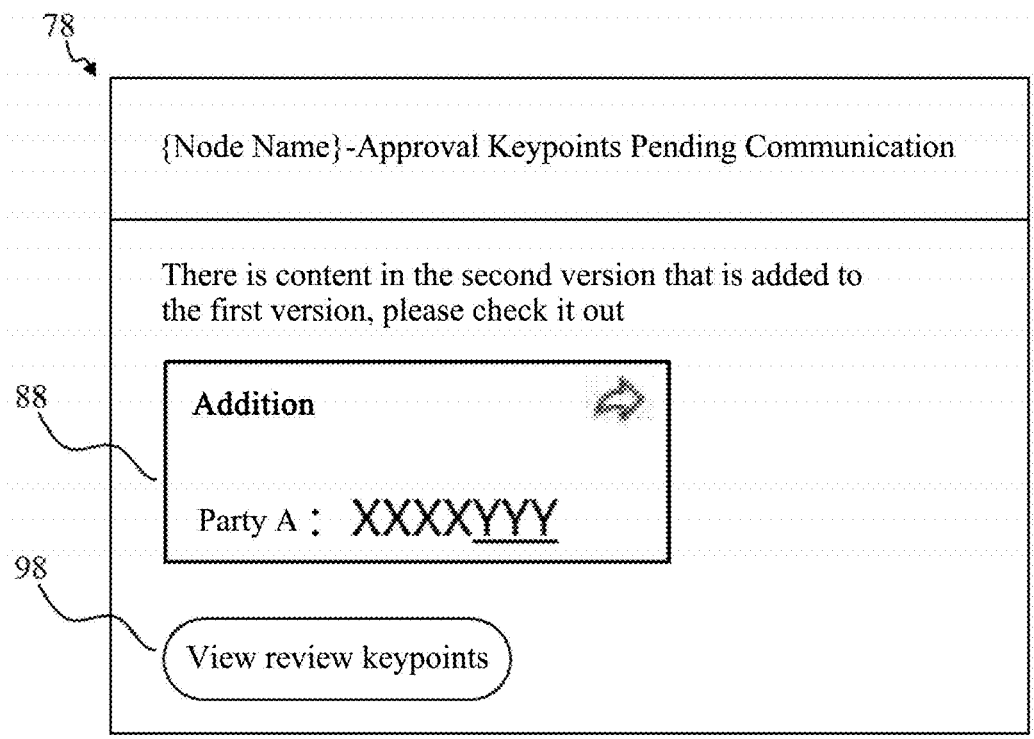
FIG. 7 is a schematic diagram of an interface for second processing chat information according to an embodiment of the present disclosure.

Referring to FIG. 7, FIG. 7 is a schematic diagram of second processing chat information according to an embodiment of the present disclosure. The second processing chat information 78 is generated based on the processing mark 61 shown in FIG. 2. The second processing chat information 78 displays chat subject information "{Node Name}—Approval Keypoints Pending Communication", type information "There is content in the second version that is added to the first version, please check it out" corresponding to the processing mark, and a snapshot 88 generated based on the processing mark, where content of the snapshot includes type information "Addition" of the processing mark, a revision mark or revision trace "YYY", and context information "Party A: XXXX" of the revision mark or revision trace.

Referring to FIG. 8, FIG. 8 is a schematic diagram of second processing chat information according to another embodiment of the present disclosure. The second processing chat information 79 displays chat subject information "{Node Name}—Approval Keypoints Pending Communication", type information "Seal content of the version to be stamped with a seal does not match the subject of an application form, please check it out" corresponding to the processing mark, and a snapshot 89 generated based on the processing mark, where content of the snapshot includes a seal pattern "XX Company".

According to one or more embodiments of the present disclosure, the second processing chat information is displayed in the chat interface of the communication group, such that the group member can quickly learn various handling keypoints for the processed document.

The information exchange method for document processing according to one or more embodiments of the present disclosure further includes the following step.

Step S153: Display an interface corresponding to the processing chat information in response to the processing chat information being triggered by a user, where the corresponding interface includes a document processing interface and/or a processing process interface for the processed document.

For example, the processing process interface may display detailed information of the processing process of the processed document, including processing time information, processing node information, processor information, processing procedure information, etc.

In this embodiment, the document processing interface and/or the processing process interface for the processed document are displayed in response to the processing chat information being triggered by the user, such that the efficiency of opening the relevant interface by the user is improved, and there is no need for the user to explore a complicated opening path by himself/herself.

In some embodiments, step S153 includes the following step.

Step D1: Display the processing process interface for the processed document in response to first processing chat information being triggered by the user; or Step D2: Display the document processing interface in response to second processing chat information being triggered by the user.

In some embodiments, after the second processing chat information is triggered by the user, a jump may be directly made to a document processing interface where a processing mark corresponding to the triggered second processing chat information is located.

Referring to FIG. 6 and FIG. 7, after the user triggers a preset identifier 87 of the first processing chat information 77 and an identifier 98 of the second processing chat information 78, respectively, a processing process interface (not shown) and the document processing interface 10 as shown in FIG. 2 can be respectively displayed.

In some embodiments, step S153 includes the following steps.

Step E1: Determine a permission of a current user in response to the processing chat information being triggered by the user.

Step E2: Display the interface corresponding to the processing chat information based on the permission.

In some embodiments, step E2 includes the following steps.

Step e21: Display the interface corresponding to the processing chat information if the permission includes a browse permission; and/or Step e22: Display an editable interface corresponding to the processing chat information if the permission includes an edit permission.

According to one or more embodiments of the present disclosure, the interface corresponding to the processing chat information is displayed based on the permission of the user, such that unauthorized access to and edition of the relevant interface can be prevented.

In some embodiments, if the processing process of the processed document proceeds to a preset processing process node, it is determined that the current user does not have the edit permission.

For example, if the processing process of the processed document is completed or proceeds to the stamping node or the archiving node, the user does not have the edit permission.

In some embodiments, if the current user is an executor of a current node of the processing process of the processed document, it is determined that the current user has the edit permission.

For example, when the current user clicks on the processing chat information, it is necessary to determine whether the current user has a document browse permission. If the current user does not have the permission, a client may display a no-permission prompt page, to give a reminder indicating that the user has no permission to open the page. If the current user has the browse permission but is not the executor of the current processing node, the client may display a non-editable document processing interface.

In some embodiments, if a processing node of the processing process corresponding to the triggered processing chat information has been handled, a non-editable document processing interface corresponding to the processing chat information is displayed. For example, if the processing node corresponding to the triggered processing chat information has been rejected or approved, none of document processing interfaces opened by the user based on the processing chat information can be edited. In this embodiment, if the processing node of the processing process corresponding to the triggered processing chat information has been handled, the non-editable document processing interface is displayed, which can prevent improper tampering of a handling history.

In some embodiments, if a version of the processed document corresponding to the triggered processing chat information is not a latest version, a preset prompt interface and/or the processing process interface for the processed document is displayed. For example, the preset prompt interface can display "This document has been re-processed, please contact the relevant approver to view the latest processing result".

In some embodiments, if the version of the processed document corresponding to the triggered processing chat information is the latest version, the executor of the current processing node has the edit permission, and an executor of a non-current processing node has only the browse permission.

Referring to FIG. 9 below, FIG. 9 is a flowchart of an information exchange method 200 for document processing according to an embodiment of the present disclosure. The method 200 includes the following steps.

Step S220: Display a document processing interface, the document processing interface being used to display a processed document and a processing mark thereof.

Step S240: In response to an operation event for a preset identifier associated with the document processing interface, generate processing chat information based on at least one of the processing mark or processing process node information of the processed document, the processing chat information being used to be shared in a chat interface.

According to one or more embodiments of the present disclosure, the processing chat information is generated based on at least one of the processing mark or the processing process node information of the processed document, to facilitate the forwarding of the processing chat information to other users or groups by a user, such that this document processing manner is more fit for a chat communication form, connecting the document processing with chat message communication, thereby improving the communication and processing efficiency of the user for document processing.

In some embodiments, the method 200 further includes the following steps.

Step 250: Display a list of candidate sharers in response to a preset sharing operation, the list of candidate sharers displaying at least one person associated with the processed document.

Step 260: Determine a sharer in response to an operation event for the sharing interface.

In some embodiments, the operation event for the sharing interface may include a selection or deletion operation event of a user on a candidate sharer displayed in the list of candidate sharers, or an operation event of a user for adding a user other than sharers in the list of candidate sharers via a functional control provided in the sharing interface. For example, the list of sharers may display one or more user names or group names.

For example, the user may select one or more members from the list of candidate sharers as the sharer, and may also delete one or more members from the list of candidate sharers and then take the remaining members as the sharer. The user may also add a user other than the members in the list of group candidate members via the functional control provided in the group creation interface, and then take the added user as the group candidate member. For example, the sharing interface further includes a search interface, and the user can search for other sharers via the search interface.

Step 270: Send the processing chat information to the sharer.

In this embodiment, the person associated with the processed document is displayed in the list of candidate sharers, to facilitate the sharing of the processing chat information with the person associated with the processed document by the user, such that the person associated with the processed document can make targeted communication on processing of the processed document via a chat.

Figure 10:
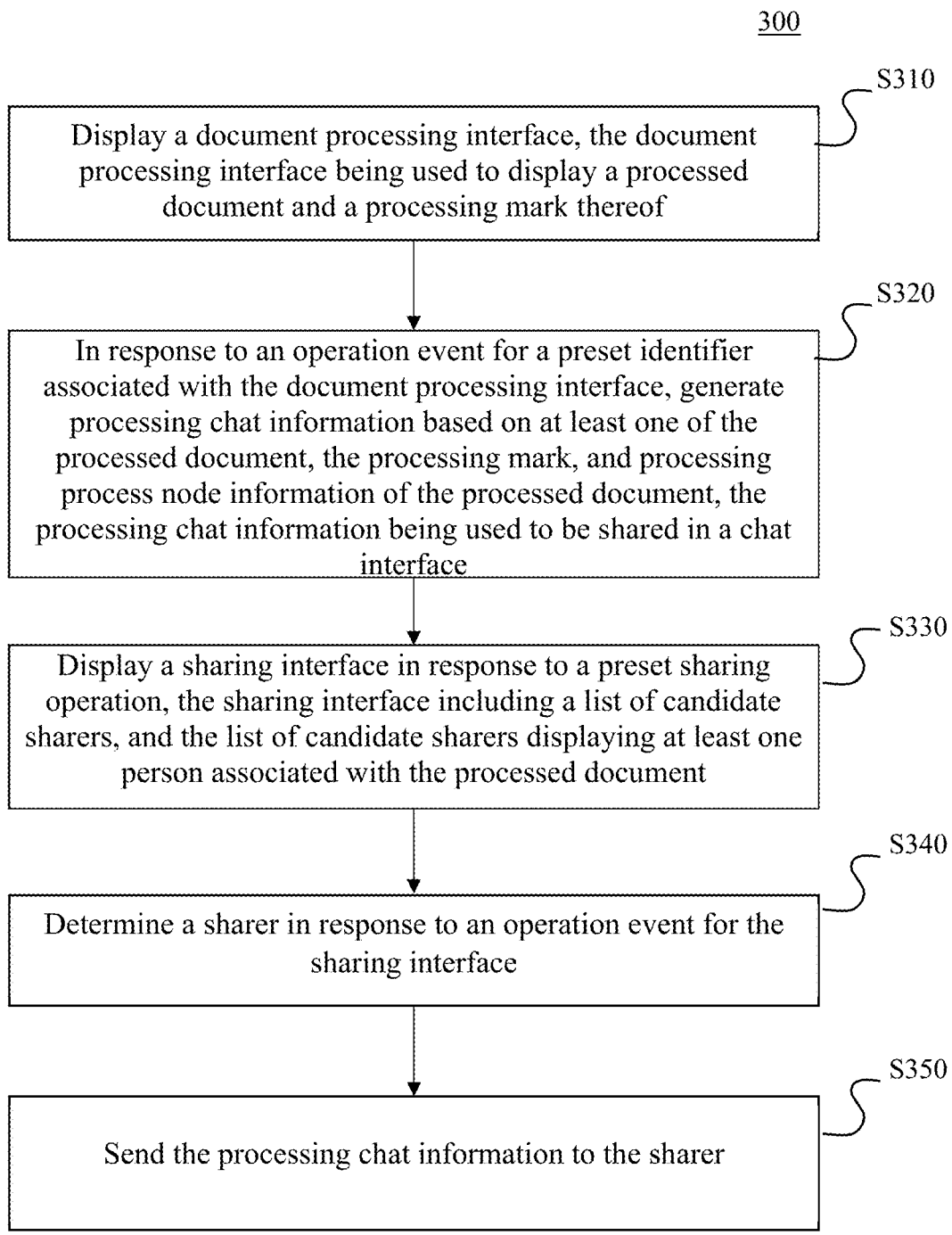
FIG. 10 is a flowchart of an information exchange method for document processing according to yet another embodiment of the present disclosure.

Referring to FIG. 10 below, FIG. 10 is a flowchart of an information exchange method 300 for document processing according to an embodiment of the present disclosure. The method 300 includes the following steps.

Step 310: Display a document processing interface, the document processing interface being used to display a processed document and a processing mark thereof.

Step 320: In response to an operation event for a preset identifier associated with the document processing interface, generate processing chat information based on at least one of the processed document, the processing mark, or processing process node information of the processed document, the processing chat information being used to be shared in a chat interface.

Step 330: Display a sharing interface in response to a preset sharing operation, the sharing interface including a list of candidate sharers, and the list of candidate sharers displaying at least one person associated with the processed document.

In some embodiments, the preset sharing operation may be the same operation as the operation event in step 320. In other words, no additional sharing operation needs to be received in step 330. In some embodiments, the sharing operation may also be an additional operation different from the operation event in step 320.

Step 340: Determine a sharer in response to an operation event for the sharing interface.

Step 350: Send the processing chat information to the sharer.

According to one or more embodiments of the present disclosure, the processing chat information is generated based on at least one of the processed document, the processing mark, or the processing process node information of the processed document, and the person associated with the processed document is displayed via the sharing interface, to facilitate the sharing of the processing chat information with the person associated with the processed document by the user, such that this document processing manner is more fit for a chat communication form, connecting the document processing with chat communication, thereby improving the communication and processing efficiency of the user for document processing.

In some embodiments, the associated person is preferentially displayed in the list of candidate sharers. For example, the person associated with the processed document is ranked higher than other persons or is highlighted in the list of candidate sharers. The associated person may be highlighted with a preset identifier. The preset identifier can display an association relationship between the associated person and the processed document, for example, displaying that the associated person is a creator or a reviser of the processed document. As such, the user can forward the processing mark to the person associated with the processed document by preferentially displaying the associated person in the list of candidate sharers.

In some embodiments, executors of process nodes are sorted in the list of candidate members according to an order of the process nodes. For example, the executors of the process nodes may be sequentially sorted according to the order of the initiator of the document processing process, first-level, second-level, and third-level handlers, etc. responsible for processing of the processed document, a person who stamps the document with a seal, and a document archivist.

In some embodiments, the list of candidate sharers displays role information, department information, and post information of the associated person in the processing process of the processed document. For example, the role information includes an initiator of the processing process of the processed document, first-level, second-level, third-level, etc. handlers responsible for processing of the processed document, a person who stamps the processed document with a seal, and an archivist of the processed document.

According to one or more embodiments of the present disclosure, the processing chat information includes first processing chat information and second processing chat information.

According to one or more embodiments of the present disclosure, there is at least one piece of second processing chat information, and each piece of second processing chat information corresponds to one or more processing marks.

According to one or more embodiments of the present disclosure, the first processing chat information includes at least one of the following content: identifier information of the processed document, type information of the processed document, processing result summary information, current node information of the processing process of the processed document, or initiator information of the processing process of the processed document.

According to one or more embodiments of the present disclosure, the second processing chat information includes at least one of the following content: content of the processing mark, a processed object corresponding to the processing mark, context information of the processed object, type information of the processing mark, or current processing node information of the processing process of the processed document.

According to one or more embodiments of the present disclosure, the content of the processing mark, the processed object corresponding to the processing mark, and the context information of the processed object are displayed as a picture in the second processing chat information.

The information exchange method for document processing according to one or more embodiments of the present disclosure further includes: displaying an interface corresponding to the processing chat information in response to the processing chat information being triggered by a user, where the corresponding interface includes a document processing interface and/or a processing process interface for the processed document.

According to one or more embodiments of the present disclosure, the displaying an interface corresponding to the processing chat information in response to the processing chat information being triggered includes: displaying the processing process interface for the processed document in response to first processing chat information being triggered by the user; or displaying the document processing interface in response to second processing chat information being triggered by the user.

According to one or more embodiments of the present disclosure, the displaying an interface corresponding to the processing chat information in response to the processing chat information being triggered by a user includes: determining a permission of a current user in response to the processing chat information being triggered by the user; and displaying the interface corresponding to the processing chat information based on the permission.

According to one or more embodiments of the present disclosure, the displaying the interface corresponding to the processing chat information based on the permission includes: displaying the interface corresponding to the processing chat information if the permission includes a browse permission; and/or displaying an editable interface corresponding to the processing chat information if the permission includes an edit permission.

According to one or more embodiments of the present disclosure, the determining a permission of a current user includes: if the processing process of the processed document proceeds to a preset processing process node, determining that the current user does not have the edit permission.

According to one or more embodiments of the present disclosure, the determining a permission of a current user includes: if the current user is an executor of a current node of the processing process of the processed document, determining that the current user has the edit permission.

According to one or more embodiments of the present disclosure, the displaying an interface corresponding to the document processing chat information in response to the document processing chat information being triggered by a user includes: if a processing node of the processing process corresponding to the triggered document processing chat information has been handled, displaying a non-editable document processing interface corresponding to the document processing chat information.

According to one or more embodiments of the present disclosure, the displaying an interface corresponding to the processing chat information in response to the processing chat information being triggered by a user includes: if a version of the processed document corresponding to the triggered processing chat information is not a latest version, displaying a preset prompt interface and/or the processing process interface for the processed document.

According to one or more embodiments of the present disclosure, the generating the processing chat information based on at least one of the processing mark or processing process node information of the processed document includes: determining a target processing mark in response to a selection operation of a user on the processing mark; and generating the processing chat information based on the target processing mark, the target processing mark including one or more processing marks.

According to one or more embodiments of the present disclosure, the generating the processing chat information based on at least one of the processed document, the processing mark, or processing process node information of the processed document includes: determining a target processing mark in response to a selection operation of a user on the processing mark; and generating the processing chat information based on the target processing mark, the target processing mark including one or more processing marks.

The information exchange method for document processing according to one or more embodiments of the present disclosure further includes: detecting whether there is a first processing mark added to the processed document; and displaying, upon detecting that there is the first processing mark, processing chat information corresponding to the first processing mark in a chat interface corresponding to the communication group.

According to one or more embodiments of the present disclosure, the first processing mark is used to indicate that the processed document is revised or that there is a difference between seal content associated with the document and document content.

According to one or more embodiments of the present disclosure, the document processing interface is used to compare at least two documents, the at least two documents including the processed document.

According to one or more embodiments of the present disclosure, the document processing interface includes a first area, a second area, and a third area, where the first area is used to display the processed document; the second area is used to display a document, other than the processed document, in the at least two documents; and the third area is used to display processing mark information, the processing mark being used to identify a difference between the processed document and the other document.

According to one or more embodiments of the present disclosure, the third area includes a first sub-interface and a second sub-interface, the first sub-interface being used to display a difference in document content, and the second interface being used to display a difference between seal content associated with the document and document content.

Figure 11:
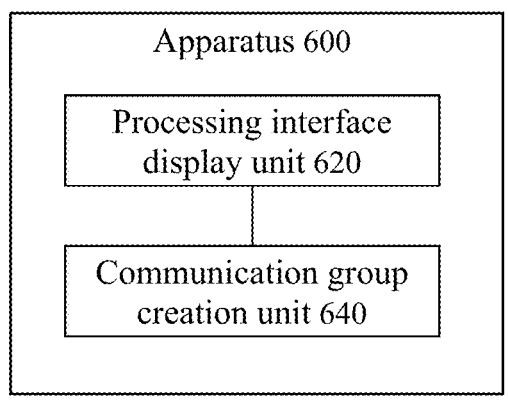
FIG. 11 is a schematic diagram of a structure of an information exchange apparatus for document processing according to an embodiment of the present disclosure.

Correspondingly, FIG. 11 shows an information exchange apparatus 600 for document processing according to an embodiment of the present disclosure. The apparatus includes: a processing interface display unit 620 configured to display a document processing interface, the document processing interface being used to display a processed document and a processing mark thereof; and a communication group creation unit 640 configured to, in response to a first operation event for a group creation identifier associated with the document processing interface, create a communication group based on at least one of a person associated with the processed document, the processed document, or the processing mark.

According to one or more embodiments of the present disclosure, in response to receiving a document upload operation in a processing interface for a first document, a second document uploaded by a user is obtained as a document associated with the first document, and at least one person associated with the first document is caused to be associated with the second document, to enable the second document to be reviewed by the at least one associated person, such that the first document and the document associated therewith can be jointly handled by the person associated with the first document.

Figure 12:
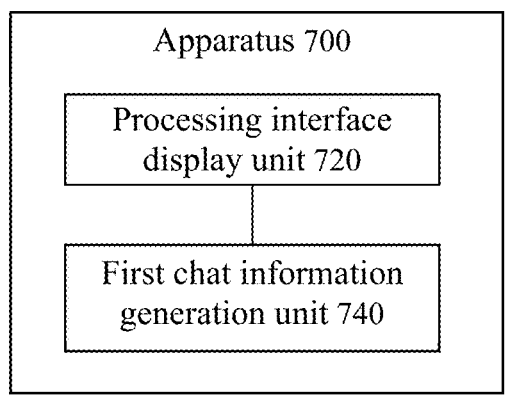
FIG. 12 is a schematic diagram of a structure of an information exchange apparatus for document processing according to another embodiment of the present disclosure.

FIG. 12 shows an information exchange apparatus 700 for document processing according to an embodiment of the present disclosure. The apparatus includes:

a processing interface display unit 720 configured to display a document processing interface, the document processing interface being used to display a processed document and a processing mark thereof; and a first chat information generation unit 740 configured to, in response to an operation event for a preset identifier associated with the document processing interface, generate processing chat information based on at least one of the processing mark or processing process node information of the processed document, the processing chat information being used to be shared in a chat interface.

According to one or more embodiments of the present disclosure, the processing chat information is generated based on at least one of the processing mark or the processing process node information of the processed document, to facilitate the forwarding of the processing chat information to other users or groups by a user, such that this document processing manner is more fit for a chat communication form, thereby improving the communication and processing efficiency of the user for document processing.

Figure 13:
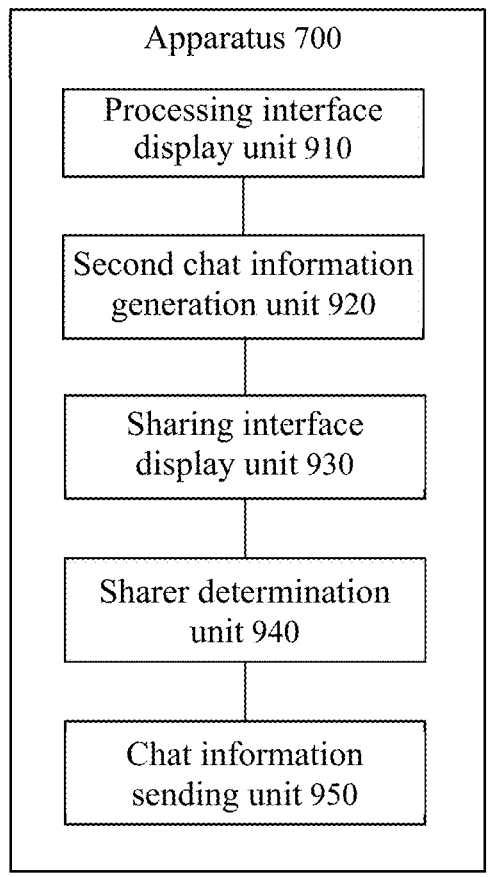
FIG. 13 is a schematic diagram of a structure of an information exchange apparatus for document processing according to yet another embodiment of the present disclosure.

FIG. 13 shows an information exchange apparatus 700 for document processing according to an embodiment of the present disclosure. The apparatus includes:

a processing interface display unit 910 configured to display a document processing interface, the document processing interface being used to display a processed document and a processing mark thereof;

a second chat information generation unit 920 configured to in response to an operation event for a preset identifier associated with the document processing interface, generate processing chat information based on at least one of the processed document, the processing mark, or processing process node information of the processed document, the processing chat information being used to be shared in a chat interface;

a sharing interface display unit 930 configured to display a sharing interface, the sharing interface including a list of candidate sharers, and the list of candidate sharers displaying at least one person associated with the processed document;

a sharer determination unit 940 configured to determine a sharer in response to an operation event for the sharing interface; and a chat information sending unit 950 configured to send the processing chat information to the sharer.

According to one or more embodiments of the present disclosure, the processing chat information is generated based on at least one of the processed document, the processing mark, or the processing process node information of the processed document, and the person associated with the processed document is displayed via the sharing interface, to facilitate the sharing of the processing chat information with the person associated with the processed document by the user, such that this document processing manner is more fit for a chat communication form, thereby improving the communication and processing efficiency of the user for document processing.

According to one or more embodiments of the present disclosure, the communication group creation unit is configured to: display a group creation interface in response to the first operation event for the group creation identifier associated with the document processing interface, the group creation interface including a list of group candidate members, and the list of group candidate members displaying at least one associated person; determine a group candidate member in response to a second operation event for the group creation interface; and create the communication group based on the group candidate member determined by a user.

According to one or more embodiments of the present disclosure, the group creation interface includes a search interface; and the determining a group candidate member in response to a second operation event for the group creation interface includes: determining the group candidate member from a preset set of users based on user information entered by the user in the search interface.

According to one or more embodiments of the present disclosure, the information exchange apparatus further includes:

an information obtaining unit configure to: obtain information entered by the user in the information edit interface; and send the entered information to the communication group after the creation of the communication group.

According to one or more embodiments of the present disclosure, the communication group creation unit includes:

a group name determination subunit configured to determine a name of the communication group based on at least one of the following: identifier information of the processed document, processing process information of the processed document, group number information, group creator information, group creation time information, or processing mark information.

According to one or more embodiments of the present disclosure, the information exchange apparatus further includes:

a second chat information generation unit configured to: the information exchange method for document processing according to one or more embodiments of the present disclosure, further including: generate processing chat information based on at least one of the processed document, the processing mark, or processing process node information of the processed document; and display the processing chat information in a chat interface corresponding to the communication group.

According to one or more embodiments of the present disclosure, the information exchange apparatus further includes:
a details interface display unit configured to display an interface corresponding to the processing chat information in response to the processing chat information being triggered by a user, where the corresponding interface includes a document processing interface and/or a processing process interface for the processed document.

According to one or more embodiments of the present disclosure, the details interface display unit is configured to: display the processing process interface for the processed document in response to first processing chat information being triggered by the user; or display the document processing interface in response to second processing chat information being triggered by the user.

According to one or more embodiments of the present disclosure, the details interface display unit configured to display an interface corresponding to the processing chat information in response to the processing chat information being triggered by a user includes: determining a permission of a current user in response to the processing chat information being triggered by the user; and displaying the interface corresponding to the processing chat information based on the permission.

According to one or more embodiments of the present disclosure, the details interface display unit is configured to: display the interface corresponding to the processing chat information if the permission includes a browse permission; and/or display an editable interface corresponding to the processing chat information if the permission includes an edit permission.

According to one or more embodiments of the present disclosure, the details interface display unit is configured to, if a processing node of the processing process corresponding to the triggered document processing chat information has been handled, display a non-editable document processing interface corresponding to the document processing chat information.

According to one or more embodiments of the present disclosure, the details interface display unit is configured to, if a version of the processed document corresponding to the triggered processing chat information is not a latest version, display a preset prompt interface and/or the processing process interface for the processed document.

According to one or more embodiments of the present disclosure, the second chat information generation unit is configured to: determine a target processing mark in response to a selection operation of a user on the processing mark; and generate the processing chat information based on the target processing mark, the target processing mark including one or more processing marks.

According to one or more embodiments of the present disclosure, the information exchange apparatus further includes:
a first processing mark synchronization unit configured to:
detect whether there is a first processing mark added to the processed document; and display, upon detecting that there is the first processing mark, processing chat information corresponding to the first processing mark in a chat interface corresponding to the communication group.

According to one or more embodiments of the present disclosure, the communication group creation unit includes:
a quick group creation unit configured to, in response to an identifier of quick group creation being triggered, create the communication group by selecting a person who is associated with the processed document and satisfies a preset condition as a group member by default.

The apparatus embodiment substantially corresponds to the method embodiment, and therefore, for related parts of the apparatus embodiment, reference may be made to part of the description of the method embodiment. The apparatus embodiment described above is merely illustrative. The modules illustrated as separate modules may be or may not be separate. Some or all of the modules may be selected according to actual requirements to achieve the objective of the solution of this embodiment. Those of ordinary skill in the art can understand and implement the embodiment without involving any creative effort.

Correspondingly, according to one or more embodiments of the present disclosure, there is provided an electronic device, the electronic device including:
at least one memory and at least one processor,
where the memory is configured to store program code, and the processor is configured to call the program code stored in the memory to cause the electronic device to perform the information exchange method for document processing according to one or more embodiments of the present disclosure.

Correspondingly, according to one or more embodiments of the present disclosure, there is provided a non-transitory computer storage medium, the non-transitory computer storage medium storing program code that is executable by a computer device to cause the computer device to perform the information exchange method for document processing according to one or more embodiments of the present disclosure.

Figure 14:
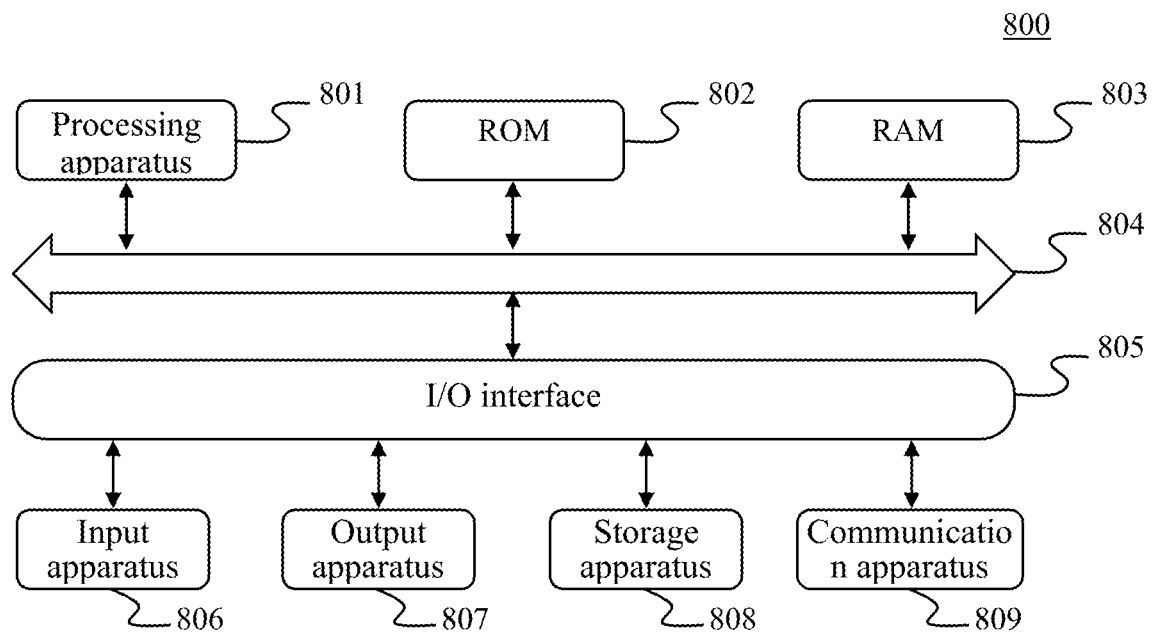
FIG. 14 is a schematic diagram of a structure of an electronic device according to an embodiment of the present disclosure.

Referring to FIG. 14 below, there is shown a schematic diagram of a structure of an electronic device (such as a terminal device or a server) 800 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 14 is merely an example, and shall not impose any limitation on the function and scope of use of the embodiments of the present disclosure.

As shown in FIG. 14, the electronic device 800 may include a processing apparatus (e.g., a central processing unit, a graphics processing unit, etc.) 801 that may perform a variety of appropriate actions and processing in accordance with a program stored in a read-only memory (ROM) 802 or a program loaded from a storage apparatus 808 into a random-access memory (RAM) 803. The RAM 803 further stores various programs and data required for the operation of the electronic device 800. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 including, for example, a touch screen, a touchpad, a keyboard, a mouse, a camera, a microphone, an accelerometer, a gyroscope, etc.; an output apparatus 807, for example, including a liquid crystal display (LCD), a speaker, a vibrator, etc.; a storage apparatus 808, for example, including a tape, a hard disk, etc.; and a communication apparatus 809. The communication apparatus 809 may allow the electronic device 800 to perform wireless or wired communication with other devices to exchange data. Although FIG. 14 shows the electronic device 800 having various apparatuses, it should be understood that it is not required to implement or have all of the shown apparatuses. Alternatively, more or fewer apparatuses may be implemented or provided.

In particular, according to an embodiment of the present disclosure, the process described above with reference to the flowcharts may be implemented as a computer software program. For example, the embodiment of the present disclosure includes a computer program product, which includes a computer program carried on a computer-readable medium, where the computer program includes program code for performing the method shown in the flowchart. In such an embodiment, the computer program may be downloaded and installed from a network through the communication apparatus 809, or installed from the storage apparatus 808, or installed from the ROM 802. When the computer program is executed by the processing apparatus 801, the above-mentioned functions defined in the method of the embodiment of the present disclosure are performed.

It should be noted that the above computer-readable medium described in the present disclosure may be a computer-readable signal medium, or a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, the client and the server can communicate using any currently known or future-developed network protocol such as a Hypertext Transfer Protocol (HTTP), and can be connected to digital data communication (for example, communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs, and the one or more programs, when executed by the electronic device, cause the electronic device to perform the method of the present disclosure described above.

Computer program code for performing operations of the present disclosure can be written in one or more programming languages or a combination thereof, where the programming languages include object-oriented programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving a remote computer, the remote computer may be connected to a computer of a user over any type of network, including a local area network (LAN) or a wide area network (WAN), or may be connected to an external computer (for example, connected over the Internet using an Internet service provider).

The flowcharts and block diagrams in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by means of software, or may be implemented by means of hardware. The name of a unit does not constitute a limitation on the unit itself in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC) system, a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, there is provided an information exchange method for document processing, the method including: displaying a document processing interface, the document processing interface being used to display a processed document and a processing mark thereof; and in response to a first operation event for a group creation identifier associated with the document processing interface, creating a communication group based on at least one of a person associated with the processed document, the processed document, or the processing mark.

According to one or more embodiments of the present disclosure, the creating a communication group based on at least one of a person associated with the in response to a first operation event for a group creation identifier associated with the document processing interface, processed document, the processed document, or the processing mark includes: displaying a group creation interface in response to the first operation event for the group creation identifier associated with the document processing interface, the group creation interface including a list of group candidate members, and the list of group candidate members displaying at least one associated person; determining a group candidate member in response to a second operation event for the group creation interface; and creating the communication group based on the group candidate member determined by a user.

According to one or more embodiments of the present disclosure, the associated person is preferentially displayed in the list of group candidate members.

According to one or more embodiments of the present disclosure, the list of group candidate members displays at least one of the following information about the associated person: role information of the associated person in a processing process of the processed document, department information of the associated person, or post information of the associated person.

According to one or more embodiments of the present disclosure, the associated person includes at least one of the following persons: an executor of a process node of a processing process of the processed document, a person associated with document content of the processed document, or a person who has a preset reporting relationship with the executor of the process node or with the person associated with the document content.

According to one or more embodiments of the present disclosure, the executor of the process node includes at least one of the following: an initiator of the processing process of the processed document, or a handler who has already handled, currently handles, or is to handle the processed document; and the person associated with the document content of the processed document includes at least one of the following: an owner, a drafter, or a reviser of the processed document.

According to one or more embodiments of the present disclosure, executors of process nodes are sorted in the list of candidate members according to an order of the process nodes.

According to one or more embodiments of the present disclosure, the list of group candidate members preferentially displays a handler who currently handles or is to handle the processed document.

According to one or more embodiments of the present disclosure, the group creation interface includes a search interface; and the determining a group candidate member in response to a second operation event for the group creation interface includes: determining the group candidate member from a preset set of users based on user information entered by the user in the search interface.

According to one or more embodiments of the present disclosure, users in the preset set of users correspond to a same community.

According to one or more embodiments of the present disclosure, the group creation interface includes an information edit interface. Information entered by the user in the information edit interface is obtained; and the entered information is sent to the communication group after the creation of the communication group.

According to one or more embodiments of the present disclosure, the creating a communication group based on at least one of a person associated with the processed document, the processed document, or the processing mark includes: determining a name of the communication group based on at least one of the following: identifier information of the processed document, processing process information of the processed document, group number information, group creator information, group creation time information, or processing mark information.

According to one or more embodiments of the present disclosure, the name of the communication group includes the group number information when at least one of the following conditions is met: at least one communication group is created based on a same processing process; or at least one communication group is created based on a same processing process node; or different communication groups are indistinguishable based on information, other than the group number information, in the name of the communication group.

The information exchange method for document processing according to one or more embodiments of the present disclosure further includes: generating processing chat information based on at least one of the processed document, the processing mark, or processing process node information of the processed document; and displaying the processing chat information in a chat interface corresponding to the communication group.

According to one or more embodiments of the present disclosure, the processing chat information includes first processing chat information and second processing chat information.

According to one or more embodiments of the present disclosure, there is at least one piece of second processing chat information, and each piece of second processing chat information corresponds to one or more processing marks.

According to one or more embodiments of the present disclosure, the first processing chat information includes at least one of the following content: identifier information of the processed document, type information of the processed document, processing result summary information, current node information of the processing process of the processed document, or initiator information of the processing process of the processed document.

According to one or more embodiments of the present disclosure, the second processing chat information includes at least one of the following content: content of the processing mark, a processed object corresponding to the processing mark, context information of the processed object, type information of the processing mark, or current processing node information of the processing process of the processed document.

According to one or more embodiments of the present disclosure, the content of the processing mark, the processed object corresponding to the processing mark, and the context information of the processed object are displayed as a picture in the second processing chat information.

The information exchange method for document processing according to one or more embodiments of the present disclosure further includes: displaying an interface corresponding to the processing chat information in response to the processing chat information being triggered by a user, where the corresponding interface includes a document processing interface and/or a processing process interface for the processed document.

According to one or more embodiments of the present disclosure, the displaying an interface corresponding to the processing chat information in response to the processing chat information being triggered includes: displaying the processing process interface for the processed document in response to first processing chat information being triggered by the user; or displaying the document processing interface in response to second processing chat information being triggered by the user.

According to one or more embodiments of the present disclosure, the displaying an interface corresponding to the processing chat information in response to the processing chat information being triggered by a user includes: determining a permission of a current user in response to the processing chat information being triggered by the user; and displaying the interface corresponding to the processing chat information based on the permission.

According to one or more embodiments of the present disclosure, the displaying the interface corresponding to the processing chat information based on the permission includes: displaying the interface corresponding to the processing chat information if the permission includes a browse permission; and/or displaying an editable interface corresponding to the processing chat information if the permission includes an edit permission.

According to one or more embodiments of the present disclosure, the determining a permission of a current user includes: if the processing process of the processed document proceeds to a preset processing process node, determining that the current user does not have the edit permission.

According to one or more embodiments of the present disclosure, the determining a permission of a current user includes: if the current user is an executor of a current node of the processing process of the processed document, determining that the current user has the edit permission.

According to one or more embodiments of the present disclosure, the displaying an interface corresponding to the document processing chat information in response to the document processing chat information being triggered by a user includes: if a processing node of the processing process corresponding to the triggered document processing chat information has been handled, displaying a non-editable document processing interface corresponding to the document processing chat information.

According to one or more embodiments of the present disclosure, the displaying an interface corresponding to the processing chat information in response to the processing chat information being triggered by a user includes: if a version of the processed document corresponding to the triggered processing chat information is not a latest version, displaying a preset prompt interface and/or the processing process interface for the processed document.

According to one or more embodiments of the present disclosure, the generating the processing chat information based on at least one of the processed document, the processing mark, or processing process node information of the processed document includes: determining a target processing mark in response to a selection operation of a user on the processing mark; and generating the processing chat information based on the target processing mark, the target processing mark including one or more processing marks.

The information exchange method for document processing according to one or more embodiments of the present disclosure further includes: detecting whether there is a first processing mark added to the processed document; and displaying, upon detecting that there is the first processing mark, processing chat information corresponding to the first processing mark in a chat interface corresponding to the communication group.

According to one or more embodiments of the present disclosure, the first processing mark is used to indicate that the processed document is revised or that there is a difference between seal content associated with the document and document content.

According to one or more embodiments of the present disclosure, the document processing interface is used to compare at least two documents, the at least two documents including the processed document.

According to one or more embodiments of the present disclosure, the document processing interface includes a first area, a second area, and a third area, where the first area is used to display the processed document; the second area is used to display a document, other than the processed document, in the at least two documents; and the third area is used to display processing mark information, the processing mark being used to identify a difference between the processed document and the other document.

According to one or more embodiments of the present disclosure, the third area includes a first sub-interface and a second sub-interface, the first sub-interface being used to display a difference in document content, and the second interface being used to display a difference between seal content associated with the document and document content.

According to one or more embodiments of the present disclosure, the in response to a first operation event for a group creation identifier associated with the document processing interface, creating a communication group based on at least one of a person associated with the processed document, the processed document, or the processing mark includes: in response to an identifier of quick group creation being triggered, creating the communication group by selecting a person who is associated with the processed document and satisfies a preset condition as a group member by default.

According to one or more embodiments of the present disclosure, there is provided an information exchange method for document processing, the method including: displaying a document processing interface, the document processing interface being used to display a processed document and a processing mark thereof; and in response to an operation event for a preset identifier associated with the document processing interface, generating processing chat information based on at least one of the processing mark or processing process node information of the processed document, the processing chat information being used to be shared in a chat interface.

According to one or more embodiments of the present disclosure, the processing chat information includes first processing chat information and second processing chat information.

According to one or more embodiments of the present disclosure, there is at least one piece of second processing chat information, and each piece of second processing chat information corresponds to one or more processing marks.

According to one or more embodiments of the present disclosure, the first processing chat information includes at least one of the following content: identifier information of the processed document, type information of the processed document, processing result summary information, current node information of the processing process of the processed document, or initiator information of the processing process of the processed document.

According to one or more embodiments of the present disclosure, the second document processing chat information includes at least one of the following content: content of the processing mark, a processed object corresponding to the processing mark, context information of the processed object, type information of the processing mark, or current processing node information of the processing process of the processed document.

According to one or more embodiments of the present disclosure, the content of the processing mark, the processed object corresponding to the processing mark, and the context information of the processed object are displayed as a picture in the second processing chat information.

The information exchange method for document processing according to one or more embodiments of the present disclosure further includes: displaying a sharing interface in response to a preset sharing operation, the sharing interface including a list of candidate sharers, and the list of candidate sharers displaying at least one person associated with the processed document; determining a sharer in response to an operation event for the sharing interface; and sending the processing chat information to the sharer.

According to one or more embodiments of the present disclosure, the associated person is preferentially displayed in the list of candidate sharers.

According to one or more embodiments of the present disclosure, an interface corresponding to the processing chat information is displayed in response to the processing chat information being triggered by a user, where the corresponding interface includes a document processing interface and/or a processing process interface for the processed document.

According to one or more embodiments of the present disclosure, there is provided an information exchange method for document processing, the method including: displaying a document processing interface, the document processing interface being used to display a processed document and a processing mark thereof; in response to an operation event for a preset identifier associated with the document processing interface, generating processing chat information based on at least one of the processed document, the processing mark, or processing process node information of the processed document, the processing chat information being used to be shared in a chat interface; displaying a sharing interface in response to a preset sharing operation, the sharing interface including a list of candidate sharers, and the list of candidate sharers displaying at least one person associated with the processed document; determining a sharer in response to an operation event for the sharing interface; and sending the processing chat information to the sharer.

According to one or more embodiments of the present disclosure, there is provided an information exchange apparatus for document processing, the apparatus including: a processing interface display unit configured to display a document processing interface, the document processing interface being used to display a processed document and a processing mark thereof; and a communication group creation unit configured to in response to a first operation event for a group creation identifier associated with the document processing interface, create a communication group based on at least one of a person associated with the processed document, the processed document, or the processing mark.

According to one or more embodiments of the present disclosure, there is provided an information exchange apparatus for document processing, the apparatus including: a processing interface display unit configured to display a document processing interface, the document processing interface being used to display a processed document and a processing mark thereof; and a first chat information generation unit configured to, in response to an operation event for a preset identifier associated with the document processing interface, generate processing chat information based on at least one of the processing mark or processing process node information of the processed document, the processing chat information being used to be shared in a chat interface.

According to one or more embodiments of the present disclosure, there is provided an information exchange apparatus for document processing, the apparatus including: a processing interface display unit configured to display a document processing interface, the document processing interface being used to display a processed document and a processing mark thereof; a second chat information generation unit configured to, in response to an operation event for a preset identifier associated with the document processing interface, generate processing chat information based on at least one of the processed document, the processing mark, or processing process node information of the processed document, the processing chat information being used to be shared in a chat interface; a sharing interface display unit configured to display a sharing interface in response to a preset sharing operation, the sharing interface including a list of candidate sharers, and the list of candidate sharers displaying at least one person associated with the processed document; a sharer determination unit configured to determine a sharer in response to an operation event for the sharing interface; and a chat information sending unit configured to send the processing chat information to the sharer.

According to one or more embodiments of the present disclosure, there is provided an electronic device, the electronic device including: at least one memory and at least one processor, where the memory is configured to store program code, and the processor is configured to call the program code stored in the memory to cause the electronic device to perform any of the information exchange methods for document processing according to one or more embodiments of the present disclosure.

According to one or more embodiments of the present disclosure, there is provided a non-transitory computer storage medium storing program code that, when executed by a computer device, causes the computer device to perform any of the information exchange methods for document processing according to one or more embodiments of the present disclosure.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features having similar functions disclosed in the present disclosure (but not limited thereto) also falls within the scope of the present disclosure.

In addition, although the various operations are depicted in a specific order, it should be understood as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable sub-combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. An information exchange method for document processing, comprising:
    displaying a document processing interface, the document processing interface displaying a processed document and a processing mark;
    in response to a first operation event performed on a group creation identifier comprised in the document processing interface, creating a communication group based on at least one of a person associated with the processed document, the processed document, or the processing mark;
    wherein the document processing interface is configured to compare the processed document and at least one other document;
    wherein the document processing interface comprises a first area configured to display the processed document, a second area configured to display the at least one other document, and a third area configured to display the processing mark; and
    wherein the processing mark is configured to identify at least one difference between the processed document and the at least one other document.

2. The information exchange method for document processing according to claim 1, wherein the in response to a first operation event performed on a group creation identifier comprised in the document processing interface, creating a communication group based on at least one of a person associated with the processed document, the processed document, or the processing mark comprises:
    displaying a group creation interface in response to the first operation event for the group creation identifier associated with the document processing interface, the group creation interface comprising a list of group candidate members, and the list of group candidate members displaying at least one associated person;
    determining a group candidate member in response to a second operation event for the group creation interface; and
    creating the communication group based on the group candidate member determined by a user.

3. The information exchange method for document processing according to claim 2, wherein at least one as follows is applied:
    the associated person is preferentially displayed in the list of group candidate members, or
    the list of group candidate members displays at least one of the following information about the associated person:
        role information of the associated person in a processing process of the processed document, department information of the associated person, and post information of the associated person, or
    the associated person comprises at least one of the following persons:
        an executor of a process node of a processing process of the processed document, a person associated with document content of the processed document, or a person who has a preset reporting relationship with the executor of the process node or with the person associated with the document content, or
    the list of group candidate members preferentially displays a handler who currently handles or is to handle the processed document.

4. The information exchange method for document processing according to claim 3, wherein at least one as follows is applied:
    the executor of the process node comprises at least one of the following: an initiator of the processing process of the processed document, or a handler who has already handled, currently handles, or is to handle the processed document; or
    the person associated with the document content of the processed document comprises at least one of the following: an owner, a drafter, or a reviser of the processed document; or
    executors of process nodes are sorted in the list of candidate members according to an order of the process nodes.

5. The information exchange method for document processing according to claim 2, wherein at least one as follows is applied:
    the group creation interface comprises a search interface, and the determining a group candidate member in response to a second operation event for the group creation interface comprises: determining the group candidate member from a preset set of users based on user information entered by the user in the search interface; or the group creation interface comprises an information edit interface, and the method further comprises: obtaining information entered by the user in the information edit interface; and sending the entered information to the communication group after the creation of the communication group.

6. The information exchange method for document processing according to claim 1, wherein the creating a communication group based on at least one of a person associated with the processed document, the processed document, or the processing mark comprises:

determining a name of the communication group based on at least one of the following: identifier information of the processed document, processing process information of the processed document, group number information, group creator information, group creation time information, or processing mark information.

7. The information exchange method for document processing according to claim 1, wherein the method further comprises at least one of:

in response to the creation of the communication group, displaying the processing chat information in a chat interface corresponding to the communication group, the processing chat information being generated based on at least one of the processed document, the processing mark, or processing process node information of the processed document;

or, detecting whether there is a first processing mark added to the processed document, and displaying, upon detecting that there is the first processing mark, processing chat information corresponding to the first processing mark in a chat interface corresponding to the communication group, wherein the first processing mark is used to indicate that the processed document is revised or that there is a difference between seal content associated with the document and document content.

8. The information exchange method for document processing according to claim 7, wherein the processing chat information comprises first processing chat information and/or second processing chat information; and wherein at least one as follows is applied:

there is at least one piece of second processing chat information, and each piece of second processing chat information corresponds to one or more processing marks, or the first processing chat information comprises at least one of the following content:

identifier information of the processed document, type information of the processed document, processing result summary information, current node information of the processing process of the processed document, or initiator information of the processing process of the processed document, or the second processing chat information comprises at least one of the following content:

content of the processing mark, a processed object corresponding to the processing mark, context information of the processed object, type information of the processing mark, or current processing node information of the processing process of the processed document, or the content of the processing mark, the processed object corresponding to the processing mark, and the context information of the processed object are displayed as a picture in the second processing chat information.

9. The information exchange method for document processing according to claim 7, wherein the method further comprises:

displaying an interface corresponding to the processing chat information in response to the processing chat information being triggered by a user, wherein the corresponding interface comprises a document processing interface and/or a processing process interface for the processed document.

10. The information exchange method for document processing according to claim 9, wherein the displaying an interface corresponding to the processing chat information in response to the processing chat information being triggered by a user comprises at least one of:

displaying the processing process interface for the processed document in response to first processing chat information being triggered by the user; or displaying the document processing interface in response to second processing chat information being triggered by the user; or determining a permission of a current user in response to the processing chat information being triggered by the user, and displaying the interface corresponding to the processing chat information based on the permission; or if a processing node of the processing process corresponding to the triggered processing chat information has been handled, displaying a non-editable document processing interface corresponding to the processing chat information; or if a version of the processed document corresponding to the triggered processing chat information is not a latest version, displaying a preset prompt interface and/or the processing process interface for the processed document.

11. The information exchange method for document processing according to claim 10, wherein the displaying the interface corresponding to the processing chat information based on the permission comprises:

displaying the interface corresponding to the processing chat information if the permission comprises a browse permission;

and/or displaying an editable interface corresponding to the processing chat information if the permission comprises an edit permission.

12. The information exchange method for document processing according to claim 11, wherein the determining a permission of a current user comprises at least one of:

if the processing process of the processed document proceeds to a preset processing process node, determining that the current user does not have the edit permission; or if the current user is an executor of a current node of the processing process of the processed document, determining that the current user has the edit permission.

13. The information exchange method for document processing according to claim 7, wherein generating the processing chat information based on at least one of the processed document, the processing mark, or processing process node information of the processed document comprises:

determining a target processing mark in response to a selection operation of a user on the processing mark; and generating the processing chat information based on the target processing mark, the target processing mark comprising one or more processing marks.

14. The information exchange method for document processing according to claim 1, wherein the third area comprises a first sub-interface and a second sub-interface, the first sub-interface configured to display one or more differences in document content between the processed document and the at least one other document, and the second interface configured to display one or more differences between seal content associated with the processed document or the at least one other document and the document content.

15. The information exchange method for document processing according to claim 1, wherein the in response to a first operation event performed on a group creation identifier comprised in the document processing interface, creating a communication group based on at least one of a person associated with the processed document, the processed document, or the processing mark comprises:

in response to an identifier of quick group creation being triggered, creating the communication group by selecting a person who is associated with the processed document and satisfies a preset condition as a group member by default.

16. An electronic device, comprising:

at least one memory and at least one processor, wherein the memory is configured to store program code, and the processor is configured to call the program code stored in the memory to cause the electronic device to perform the method according to claim 1.

17. A non-transitory computer storage medium, storing program code that, when executed by a computer device, causes the computer device to perform the method according to claim 1.

18. An information exchange method for document processing, comprising:

displaying a document processing interface, the document processing interface displaying a processed document and a processing mark;

in response to an operation event performed on a preset identifier comprised in the document processing interface, generating processing chat information based on at least one of the processing mark or processing process node information of the processed document, the processing chat information being to be shared in a chat interface;

wherein the document processing interface is configured to compare the processed document and at least one other document;

wherein the document processing interface comprises a first area configured to display the processed document, a second area configured to display the at least one other document, and a third area configured to display the processing mark; and wherein the processing mark is configured to identify at least one difference between the processed document and the at least one other document.

19. The information exchange method for document processing according to claim 18, wherein the method further comprises:

displaying a sharing interface in response to a preset sharing operation, the sharing interface comprising a list of candidate sharers, and the list of candidate sharers displaying at least one person associated with the processed document;

determining a sharer in response to an operation event for the sharing interface; and sending the processing chat information to the sharer.

20. An information exchange method for document processing, comprising:

displaying a document processing interface, the document processing interface displaying a processed document and a processing mark;

in response to an operation event performed on a preset identifier comprised in the document processing interface, generating processing chat information based on at least one of the processed document, the processing mark, or processing process node information of the processed document, the processing chat information being to be shared in a chat interface;

displaying a sharing interface, the sharing interface comprising a list of candidate sharers, and the list of candidate sharers displaying at least one person associated with the processed document;

determining a sharer in response to an operation event for the sharing interface; and sending the processing chat information to the sharer;

wherein the document processing interface is configured to compare the processed document and at least one other document;

wherein the document processing interface further comprises an area configured to display the processing mark; and wherein the processing mark is configured to identify at least one difference between the processed document and the at least one other document.

* * * * *